(12) United States Patent
Wingert

(10) Patent No.: US 7,866,124 B2
(45) Date of Patent: *Jan. 11, 2011

(54) METHOD AND AGRICULTURAL BAGGER WITH UPPER TUNNEL COMPACTION

(76) Inventor: Paul R. Wingert, County Road 8, R.R. 1 - Box 192, Plainview, MN (US) 55964

( * ) Notice: Subject to any disclaimer, the term of this patent is extended or adjusted under 35 U.S.C. 154(b) by 0 days.

This patent is subject to a terminal disclaimer.

(21) Appl. No.: 12/510,252

(22) Filed: Jul. 27, 2009

(65) Prior Publication Data

US 2009/0282785 A1  Nov. 19, 2009

Related U.S. Application Data

(63) Continuation of application No. 11/769,707, filed on Jun. 27, 2007, now abandoned, which is a continuation of application No. 11/279,390, filed on Apr. 11, 2006, now abandoned, which is a continuation of application No. 09/977,036, filed on Oct. 11, 2001, now Pat. No. 7,024,839.

(51) Int. Cl.
*B65B 1/24* (2006.01)

(52) U.S. Cl. .............. 53/438; 53/527; 53/529; 53/567; 141/73

(58) Field of Classification Search .......... 53/436, 53/438, 439, 523, 526, 527, 529, 530, 567, 53/576; 100/65, 100, 141, 229 A, 233, 138, 100/139; 141/73, 114
See application file for complete search history.

(56) References Cited

U.S. PATENT DOCUMENTS

| | | | |
|---|---|---|---|
| 2,552,888 A | 5/1951 | Druetta | |
| 2,917,993 A * | 12/1959 | Nikkel | 100/142 |
| 3,022,723 A | 2/1962 | Templeton | |
| 3,070,006 A | 12/1962 | Raney et al. | |
| 3,179,131 A | 4/1965 | Kissling | |
| 3,479,950 A | 11/1969 | Freeman | |
| 3,613,926 A | 10/1971 | Scroggins | |
| 3,757,501 A | 9/1973 | Bennett, Jr. et al. | |
| 3,771,733 A | 11/1973 | Hadley | |

(Continued)

FOREIGN PATENT DOCUMENTS

DE    3619251    12/1987

*Primary Examiner*—Thanh K Truong
(74) *Attorney, Agent, or Firm*—Charles A. Lemaire; Jonathan M. Rixen; Lemaire Patent Law Firm, P.L.L.C.

(57) ABSTRACT

An agricultural bagger apparatus and method for compacting feed into a horizontally deployed bag including a compression mechanism and an input hopper that receives agricultural feed. The hopper has a sloping wall and a lower end exit chute located to transfer the feed into the primary compression mechanism (e.g., a rotating toothed cylinder). The tapered hopper causes the feed to bridge, stopping the feed from falling through the chute. A new distribution mechanism in the hopper sweeps the feed adjacent to the sloping wall to prevent feed bridging. By preventing the feed from clogging, there is less reason to risk one=s safety by foolishly inserting their limb into the hopper. Some embodiments also compact feed in the upper portion of the tunnel, for example, by reciprocating a hinged piston above the primary compression mechanism. This increases the compaction on the top portion of the tunnel without unduly juicing the feed.

20 Claims, 18 Drawing Sheets

U.S. PATENT DOCUMENTS

| | | | |
|---|---|---|---|
| 3,783,578 A | 1/1974 | Willis et al. |
| 3,876,055 A | 4/1975 | Tyznik |
| 3,881,407 A | 5/1975 | Goar |
| 3,884,395 A | 5/1975 | Keenan |
| 4,033,101 A | 7/1977 | Fritz et al. |
| 4,046,068 A | 9/1977 | Eggenmuller et al. |
| 4,072,273 A | 2/1978 | Reiniger |
| 4,095,604 A | 6/1978 | Labbe |
| 4,100,023 A | 7/1978 | McDonald |
| 4,241,562 A | 12/1980 | Meyer |
| 4,310,036 A | 1/1982 | Rasmussen et al. |
| 4,337,805 A | 7/1982 | Johnson et al. |
| 4,344,580 A | 8/1982 | Hoshall et al. |
| 4,489,648 A | 12/1984 | Naaktgeboren |
| 4,501,382 A | 2/1985 | van Twuyver |
| 4,502,378 A | 3/1985 | Cullen |
| 4,548,131 A | 10/1985 | Williams |
| 4,584,790 A | 4/1986 | Gaughen |
| 4,611,642 A | 9/1986 | Durhman |
| 4,621,666 A | 11/1986 | Ryan |
| 4,672,794 A | 6/1987 | Good |
| 4,686,817 A | 8/1987 | Brodrecht et al. |
| 4,688,480 A | 8/1987 | Ryan |
| 4,712,362 A | 12/1987 | Cornet et al. |
| 4,721,503 A | 1/1988 | Rasmussen et al. |
| 4,724,876 A | 2/1988 | Ryan |
| 4,766,717 A | 8/1988 | Thomann |
| 4,803,832 A | 2/1989 | Crawford |
| 4,829,895 A | 5/1989 | Juhuku |
| 4,867,736 A | 9/1989 | Rasmussen et al. |
| 4,896,593 A | 1/1990 | Slusser |
| 4,899,867 A | 2/1990 | Ryan |
| 4,907,503 A | 3/1990 | Ryan |
| 4,949,633 A | 8/1990 | Johnson et al. |
| 4,955,188 A | 9/1990 | von Allworden |
| 5,113,917 A | 5/1992 | McGregor |
| 5,123,338 A | 6/1992 | Mathis |
| 5,140,802 A | 8/1992 | Inman et al. |
| 5,151,000 A | 9/1992 | Geraghty et al. |
| 5,155,975 A | 10/1992 | Knowler |
| 5,178,061 A | 1/1993 | Alonso-Amelot |
| 5,197,682 A | 3/1993 | Del Zotto |
| 5,213,143 A | 5/1993 | Policky et al. |
| 5,215,228 A | 6/1993 | Andrews et al. |
| 5,220,772 A | 6/1993 | Koskela et al. |
| 5,253,570 A | 10/1993 | Roeckner |
| 5,295,554 A | 3/1994 | Cullen |
| 5,297,377 A | 3/1994 | Cullen |
| 5,313,768 A | 5/1994 | Cullen |
| 5,345,744 A | 9/1994 | Cullen |
| 5,355,659 A | 10/1994 | Cullen |
| 5,367,860 A | 11/1994 | Cullen |
| 5,396,753 A | 3/1995 | Cullen |
| 5,398,736 A | 3/1995 | Cullen |
| 5,408,809 A | 4/1995 | Cullen |
| 5,408,810 A | 4/1995 | Cullen |
| 5,413,155 A | 5/1995 | Ryan |
| 5,419,102 A | 5/1995 | Inman et al. |
| 5,421,142 A | 6/1995 | Cullen |
| 5,425,220 A | 6/1995 | Cullen |
| 5,426,910 A | 6/1995 | Cullen |
| 5,452,562 A | 9/1995 | Cullen |
| 5,461,843 A | 10/1995 | Garvin et al. |
| 5,463,849 A | 11/1995 | Cullen |
| 5,464,049 A | 11/1995 | Cullen |
| 5,469,693 A | 11/1995 | Brodrecht |
| 5,517,806 A | 5/1996 | Cullen |
| 5,519,990 A | 5/1996 | Rodewald et al. |
| 5,566,532 A | 10/1996 | Inman et al. |
| 5,570,565 A | 11/1996 | Simpson |
| 5,724,793 A | 3/1998 | Inman et al. |
| 5,735,199 A | 4/1998 | Esau et al. |
| 5,799,472 A | 9/1998 | Cullen |
| 5,819,643 A | 10/1998 | McIlwain et al. |
| 5,860,271 A | 1/1999 | Inman et al. |
| 5,878,552 A | 3/1999 | Wingert |
| 5,894,713 A | 4/1999 | Cullen |
| 6,026,741 A | 2/2000 | Lippens et al. |
| 6,061,999 A | 5/2000 | Wingert |
| 6,379,086 B1 | 4/2002 | Goth |
| 6,430,897 B1 | 8/2002 | Cameron et al. |
| 6,516,590 B2 | 2/2003 | Inman et al. |
| 6,708,851 B2 | 3/2004 | DaSilva |
| 7,024,839 B2 | 4/2006 | Wingert |

\* cited by examiner

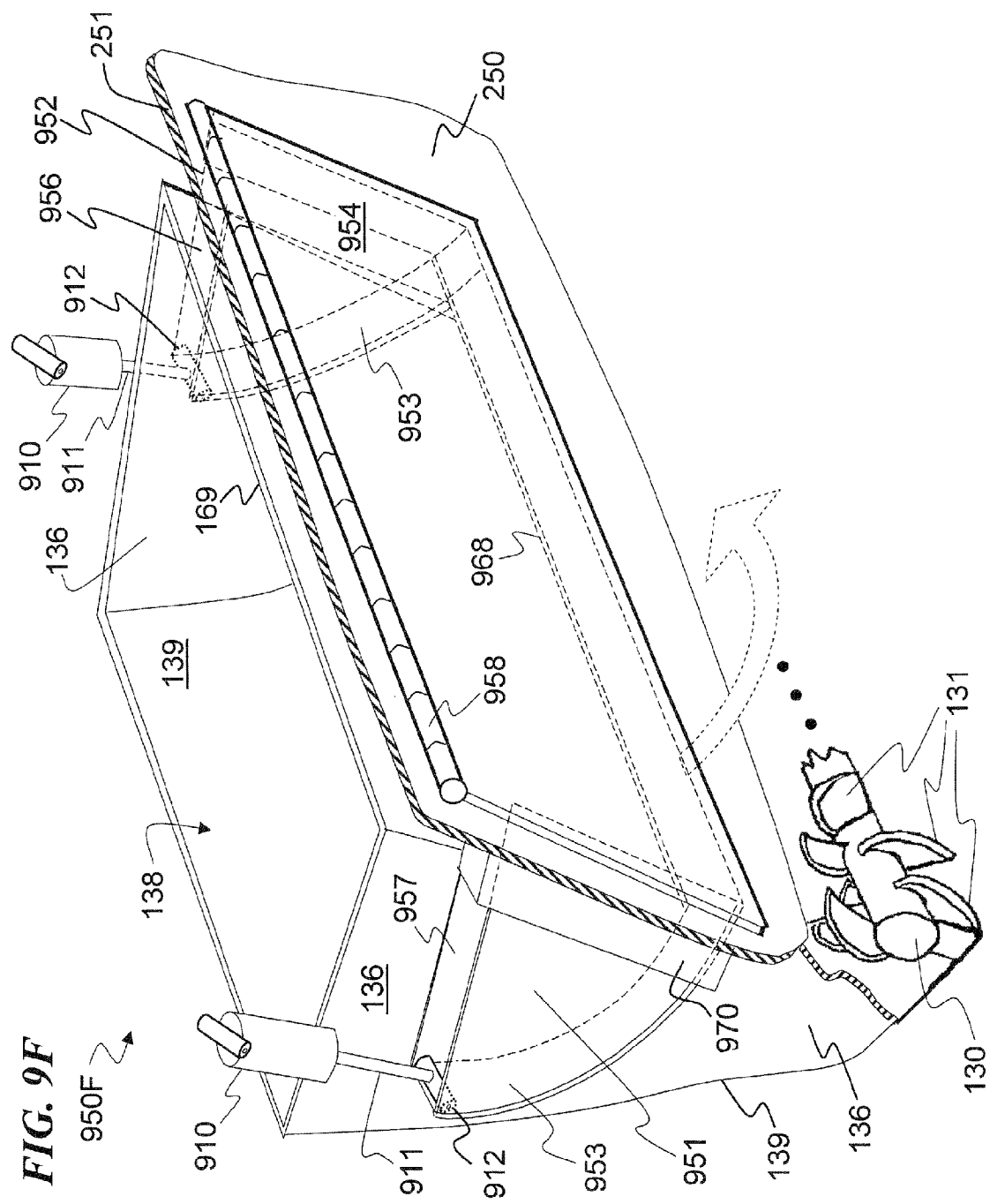

METHOD AND AGRICULTURAL BAGGER WITH UPPER TUNNEL COMPACTION

CROSS-REFERENCE TO RELATED APPLICATIONS

This is a continuation of, and claims benefit of, U.S. patent application Ser. No. 11/769,707, Filing Date Jun. 27, 2007 (now abandoned), which is a continuation of, and claims benefit of, U.S. patent application Ser. No. 11/279,390, Filing Date Apr. 11, 2006 (now abandoned), which is a continuation of, and claims benefit of, U.S. patent application Ser. No. 09/977,036, Filing Date Oct. 11, 2001, now U.S. Pat. No. 7,024,839, issued Apr. 11, 2006, each which is incorporated herein by reference in its entirety.

FIELD OF THE INVENTION

This invention relates to the field of agricultural baggers, and more specifically to a method and apparatus of displacing pressure in the upper tunnel and for preventing bridging of feed in the input chute.

BACKGROUND OF THE INVENTION

Horizontally expandable, silage storage bags are commonly used as an alternative to permanent feed storage structures such as barns and silos. From an economic standpoint, an expandable plastic storage bag is preferable to a more elaborate, permanent structure. Further, the expandable bags are more easily loaded with feed than permanent structure and the silage stored therein is readily accessible for use, for example using a small tractor with a front bucket to unload the feed.

An exemplary prior art bagger is described in U.S. Pat. No. 5,878,552 (which patent is incorporated herein in its entirety by reference), to Paul Wingert, the present applicant. A tractor-powered bag-loading apparatus is disclosed in association with an expandable bag. A backstop is located at the filled end of the bag and has attached thereto laterally spaced cables which extend forward to rotatable cable drums on the bagger machine. The drums are yieldably braked and, under a predetermined force applied to the cables, release the cable to allow movement of the bag-loading apparatus and tractor away from the filled end of the bag as it is filled. The bag is filled by a toothed rotor which propels silage through a tapered tunnel and into the bag inlet. The tapered tunnel described in U.S. Pat. No. 5,878,552 provides a smooth, more evenly filled bag.

The bag for use with such bagging machines is manufactured and delivered in a pleated shape, i.e., folded into an accordion-bellows-type shape. Typically, a bag having a nominal ten-foot-diameter (approximately 3 meters diameter, or 9.6 meters circumference) and a 300-foot length (approximately 90 meters length) will be folded to a 10-foot-diameter (about 3 meters) ring about one foot (about 0.3 meter) long and 1 foot (about 0.3 meter) thick. To start the loading operation, this bag-ring is pre-loaded around the tunnel, and the pleats are unfolded one at a time as the bag is deployed and filled with feed stock. Once any portion of the bag fills with feed, that portion becomes very heavy, and does not move. Thus the bagger machine itself is propelled along the ground in front of the bag being filled.

FIG. 1 shows a side view of a prior-art bagger 100 (also called feed-bagging machine 100) such as shown and describes in U.S. Pat. No. 5,878,552 by the inventor of the present invention, hereby incorporated by its entirety by reference. The feed bagger is not pulled; rather, the pressure from the feed filling the bag pushes the bagger 100 and the tractor (not shown) that is powering it (bagger 100) ahead at a rate equal to the filling rate of bag 99. A steel cable between bagger 100 and a backstop (not shown, but which is to the right of the apparatus and bag shown in FIG. 1) is yieldably held by a disk-brake mechanism. This ensures the feed is compacted before the bagger is allowed to advance. A rotor 130 having multiple teeth 131, and powered by a power-take-off (PTO) shaft 133 from the tractor that powers bagger 100, forces feed 98 up and back into a tunnel 250. In some embodiments, tunnel 250 is a long tapered tunnel such as described in U.S. Pat. No. 5,878,552.

Movable upper bag bracket 125 is used to lift the folded bag 99 into place on the outside of tunnel 250, and supports/holds the folded bag 99 at the front end of the top of tunnel 250 as it unfolds from the inside of the folded bag. Lower bag tray 120 is tilted up at its trailing edge, supported at its front edge by brackets 121, and yieldably supported at its back edge by spring-and-chain (not shown, but which can have its force adjusted by setting various chain links of the chain onto a fixed hook at the top). The feed is dropped into hopper 139. Such a bagger 100 has a tunnel 250 that provides some support for bag 99 as it unfolds, but which has side walls along which the bag unfolds that are ovoid such that the bag is stretched slightly and then released as it passes over tunnel 250 in the direction of travel of the bagger 100. The bagger tunnel provides some back-pressure to the feed which thus extrudes into the bag rearward at a substantially constant pressure.

There are numerous problems that one contends with using previous bagging structures. For example, there is a safety problem caused by feed that bridges within the tapered hopper. Persons may be tempted to unclog the hopper by stomping or otherwise inserting an arm or a leg thus risking being sucked through and shredded by the primary compression mechanism.

Conventional baggers also suffer from an inability to adequately compact feed in the upper portion of the tunnel, thus leaving the feed in the lower bag highly compacted and the feed in the upper bag only moderately compacted.

SUMMARY OF THE INVENTION

The invention provides an agricultural bagger apparatus for compacting feed into a horizontally deployed bag. The apparatus includes a primary compression mechanism and an input hopper that receives agricultural feed. The hopper has a sloping wall and a lower-end exit chute located to transfer the agricultural feed into the primary compression mechanism. The tapered hopper tends to cause the feed to bridge, stopping the feed from falling into the chute. The apparatus also includes a first motor coupled to the sloping wall of the input hopper, and a first distribution mechanism inside the hopper to move the agricultural feed that was adjacent to the sloping wall in order to prevent feed bridging in the hopper before the primary compression mechanism.

Another aspect of the invention improves the flow of agricultural feed in an agricultural feed stock bagging machine having a tunnel and a primary compression mechanism fed by a hopper with a sloping wall. The feed is deposited into a hopper and pressure within the feed along the sloping wall is displaced and feed is swept along the sloping wall to reduce the tendency for the feed to bridge in the hopper in order that the feed continuously flows toward the primary compression mechanism. This is a major safety innovation to prevent a situation where a bagger machine operator might otherwise climb into the input hopper in a dangerous attempt to free the bridged feed and restart the flow of feed through the hopper. By preventing the clogged feed, there is less motivation for a person to foolishly insert an arm or foot into the hopper.

Yet another aspect of the invention provides a method for feeding a feed bag connected to a feed tunnel. The method includes compacting feed from the upper portion of the tunnel toward the central portion of the tunnel, and displacing pressure from the lower portion of the tunnel to the upper portion of the tunnel.

In some embodiments, the method further includes an oscillating piston connected to a hinged apparatus above the primary compression mechanism, and a reciprocating apparatus connected to the reciprocating piston to displace pressure inside the feed tunnel above the primary compression mechanism. This increases the compaction on the top portion of the tunnel without unduly juicing the feed.

BRIEF DESCRIPTION OF THE DRAWINGS

FIG. 9F is an isometric view of hydraulic cylinder 910 showing hinged movement of a single plated secondary compression mechanism 950.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1:
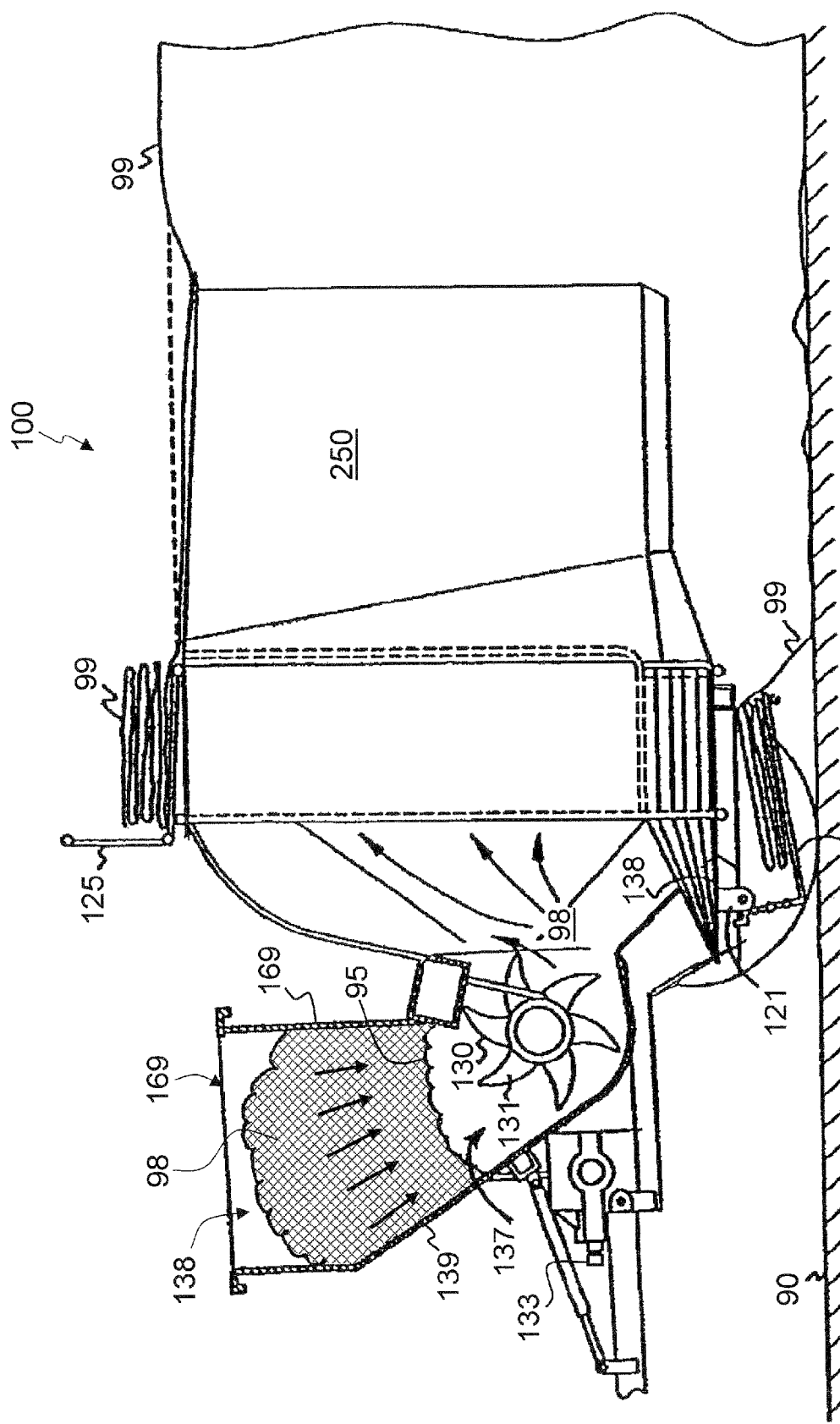
FIG. 1 shows a side view of prior art bagging machine 100.

FIG. 1 is a side view of a prior-art bagging machine 100 whereby feed 96 is deposited into hopper 138 and moves downward along sloping wall 139 toward primary compression mechanism 130 consisting of rotating mechanism having multiple teeth 131 and powered by a power-take-off (PTO) shaft 133. Feed 98 is pushed down into primary compression mechanism 130 and forced up and back by primary compression mechanism 130 into tunnel 250. Movable upper bag bracket 125 is used to lift folded bag 99 into place on the outside of tunnel 250 while lower bag tray 120 may be adjusted by brackets 121 to assist bag 99 to pass to the back end of tunnel 250 where feed 98 is compacted into bag 99 which is stretched from the circumference of the back of tunnel 250 and deployed as agricultural bagger machine 100 moves forward along ground 90. A typical bag will be about 9 to 12 feet (3 to 4 meters) in diameter and about 250 feet (about 80 meters) or longer in length when filled.

In this description, the term "curvical" means a curved motion that includes a series of arcuate motions from end to end. Examples include a circle, an ellipse, other flatted convex curves, curves having both convex and concave portions as well as motions including curved and straight sections. In this description, the term "piston" is defined as any mechanism that reciprocates between a compressed position and a withdrawn position. Such a piston is typically plate steel fabricated to a solid external shape that can be extended into a body of feed to compact the feed and then withdrawn to a position that allows additional feed into the volume that the wedge used to occupy. In this description, the term "wedge piston" is defined as any hinged mechanism that reciprocates between a compressed position and a withdrawn position. Such a wedge piston is typically plate steel fabricated to a solid external shape that can be extended into a body of feed to compact the feed and then withdrawn to a position that allows additional feed into the volume that the wedge used to occupy.

Another exemplary bagging machine is described in U.S. patent application Ser. No. 09/721,268 filed on Nov. 22, 2000, entitled "Improved Agricultural Feed Bagger and Method" by Paul Wingert, the inventor of the present application. U.S. patent application Ser. No. 09/721,268 is incorporated in its entirety, by reference. In some embodiments of the present invention, a large conveyer-belt bed 970, as described in U.S. patent application Ser. No. 09/721,268, is provided for loading voluminous quantities of agricultural material into hopper 138 (see FIG. 10, below). The feed 98 exits hopper 138 through chute 137 at its lower end. Such a loading mechanism exacerbates the problem of feed 98 bridging 95 within hopper 138, and the present invention is useful in such an arrangement to prevent such bridging.

Figure 2:
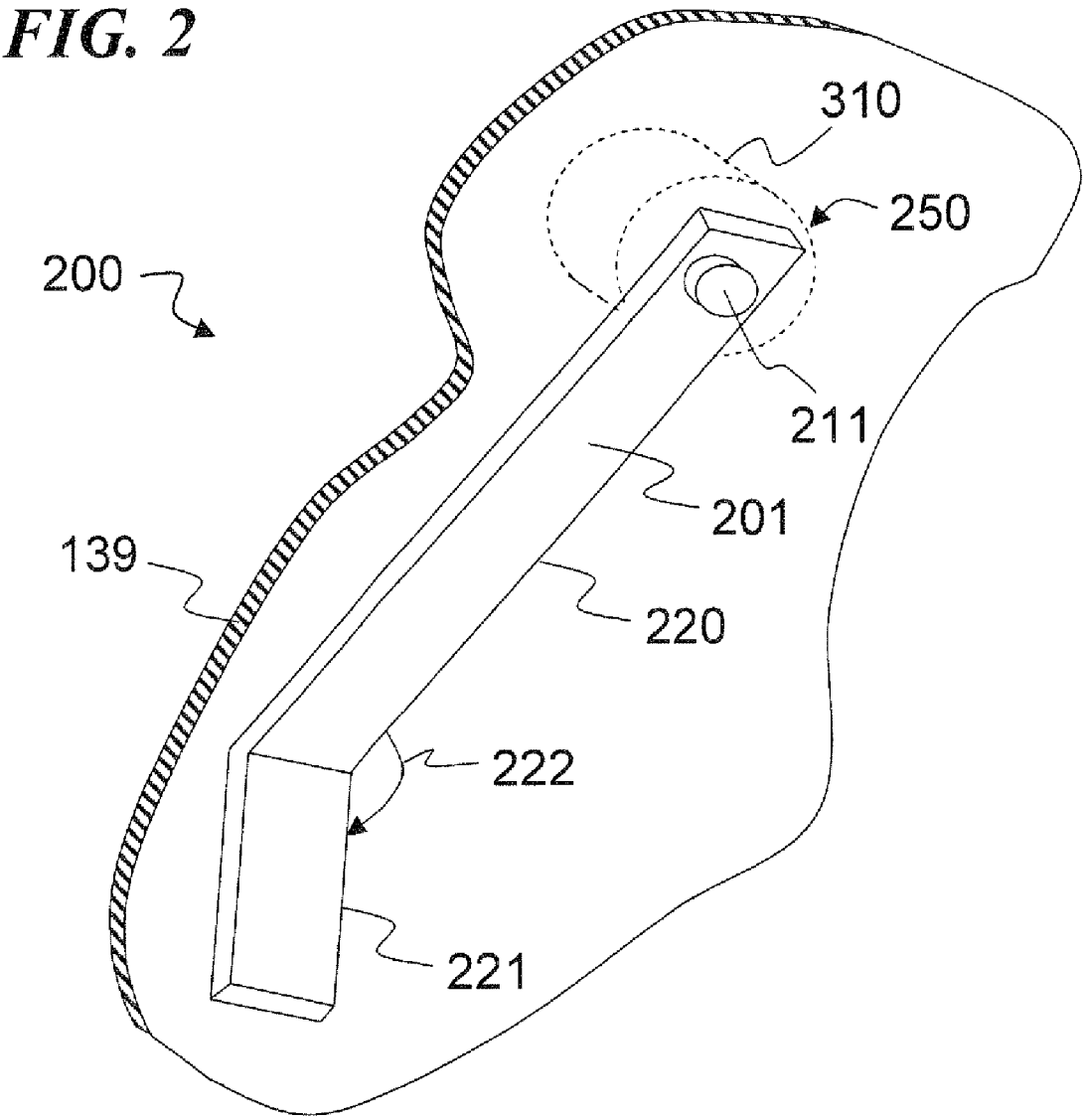
FIG. 2 is an isometric cutaway view showing a portion of sloping wall 139 and a single bar distribution mechanism 250.

FIG. 2 is an isometric cutaway view 200 showing a portion of sloping wall 139 and single-bar distribution mechanism 220 connected by motor 310. Elongated first bar 201 is connected to motor 310 by peg 211. In some embodiments, first bar 201 is bent to an angle 222 and at end 221 distal to the connection of motor 310.

Motor 310 rotates first bar 201 connected by axle 211 in a curvical motion along sloping wall 139. The curvical motion (in this case, the curvical motion is circular) of first bar 201 bent to an angle 222 and at end 221 agitates and sweeps feed 98 at a distance along sloping wall 139 in a curvical motion, preventing bridging 95 of feed 98 in hopper 138 while displacing pressure along sloping wall 139 toward primary compression mechanism 130 and displaces pressure within chute 137 above primary compression mechanism 130 to a portion of the interior hopper 138. Agitating or sweeping the feed 98 that is along the sloping wall prevents an arch from forming.

Figure 3A:
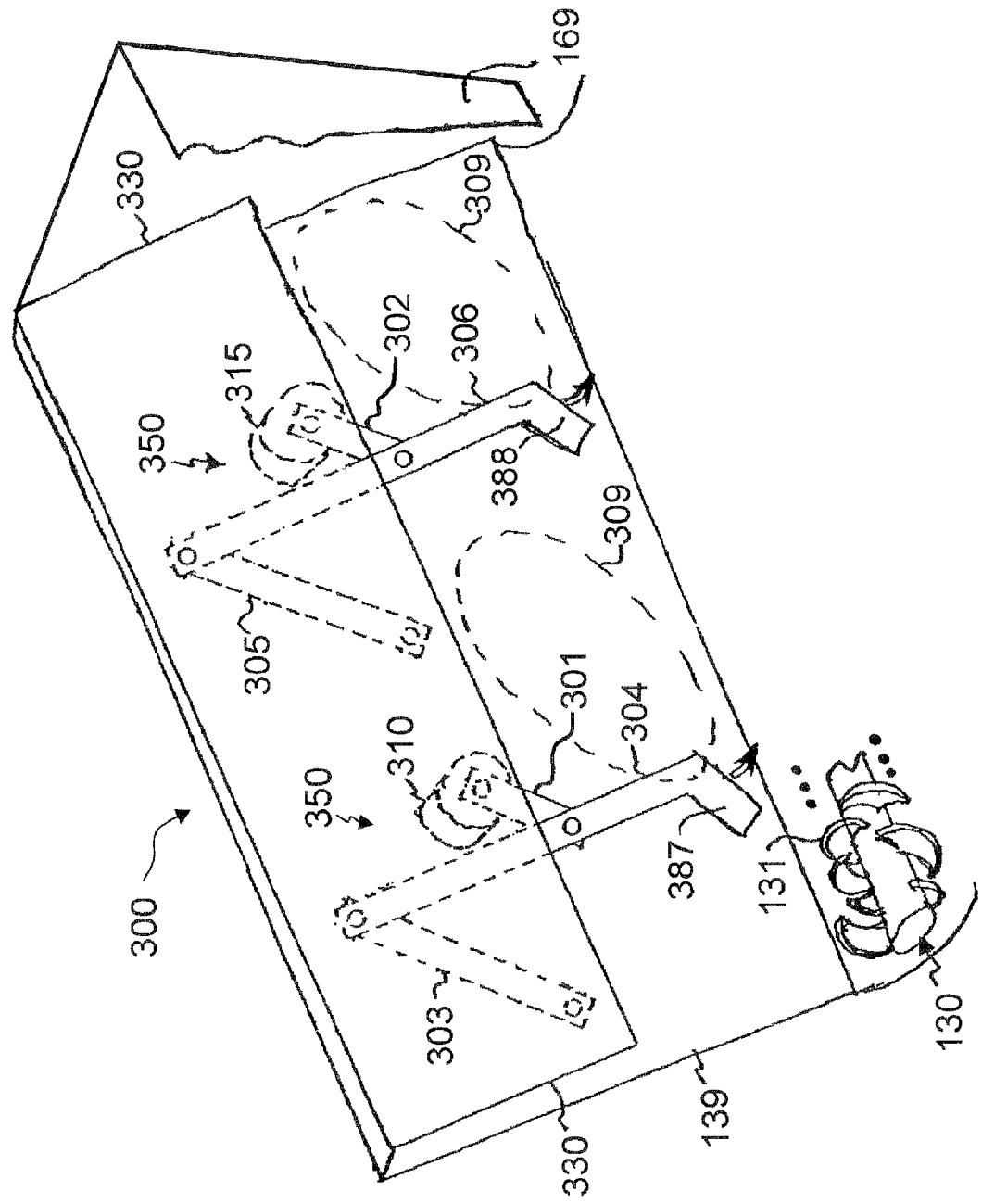
FIG. 3A is an isometric view showing sloping wall 139 and two partially covered distribution mechanisms 350.

FIG. 3A is an isometric view of another embodiment showing sloping wall 139 and distribution mechanisms 350 partially covered by cover 330. First motor 310 is connected to elongated first bar 301, and second motor 315 is connected to elongated second bar 302 such that the bars can be rotated in a curvical motion along sloping wall 139. Third bar 303 and fifth bar 305 are hingedly connected to sloping wall 139 of hopper 138. Fourth bar 304 is hingedly connected to third bar 303 and hingedly connected to first bar 301 near an end distal to its connection to first motor 310. Sixth bar 306 is hingedly connected to fifth bar 305 and hingedly connected to second bar 302 near an end distal to its connection to second motor 315.

Motors 310 and 315 rotate first bar 301 and second bar 302 respectively in curvical motions along sloping wall 139. The circular motion of first bar 301 drives hingedly connected fourth bar 304 hingedly connected to third bar 303 in a curvical motion 350. The circular motion of second bar 302 drives hingedly connected sixth bar 306 hingedly connected to fifth bar 305 in a curvical motion. The curvical motions of the respective lower ends of fourth bar 304 and sixth bar 306, which may, in some embodiments, be flat and in plane, and angled as a hockey-stick shape 387 and 388, respectively, and parallel to sloping wall 139. In other embodiments, the ends 387 and 388 are bent to an angle 222 (such as is shown FIG. 7) at end 221 distal to the connection of first motor 310 and second motor 315. In their respective embodiments, bar ends 307, 308, 387, 388 and/or ends 221 agitate, cut and/or sweep feed 98 along sloping wall 139 in curvical motions 309, thus preventing bridging 95 of feed 98 in hopper 138, while displacing pressure along sloping wall 139 toward primary compression mechanism 130 and displaces pressure within chute 137 from above primary compression mechanism 130 to a portion of the interior of hopper 138. In some embodiments, curvical motion 309 is designed such that a broad face 307 on the lower end of bar 304 is addressing the feed on the down sweep, but the narrow heal of portion 307 is addressing the feed on the up sweep. This provides a greater net downward motion to the feed and cuts one end of the arch (the end against sloping wall 139), thus preventing an unmovable bridge from forming in hopper 138. This safety enhancement removes the motivation for the operator from climbing onto the feed into the hopper in order to manually break the bridge.

Figure 3B:
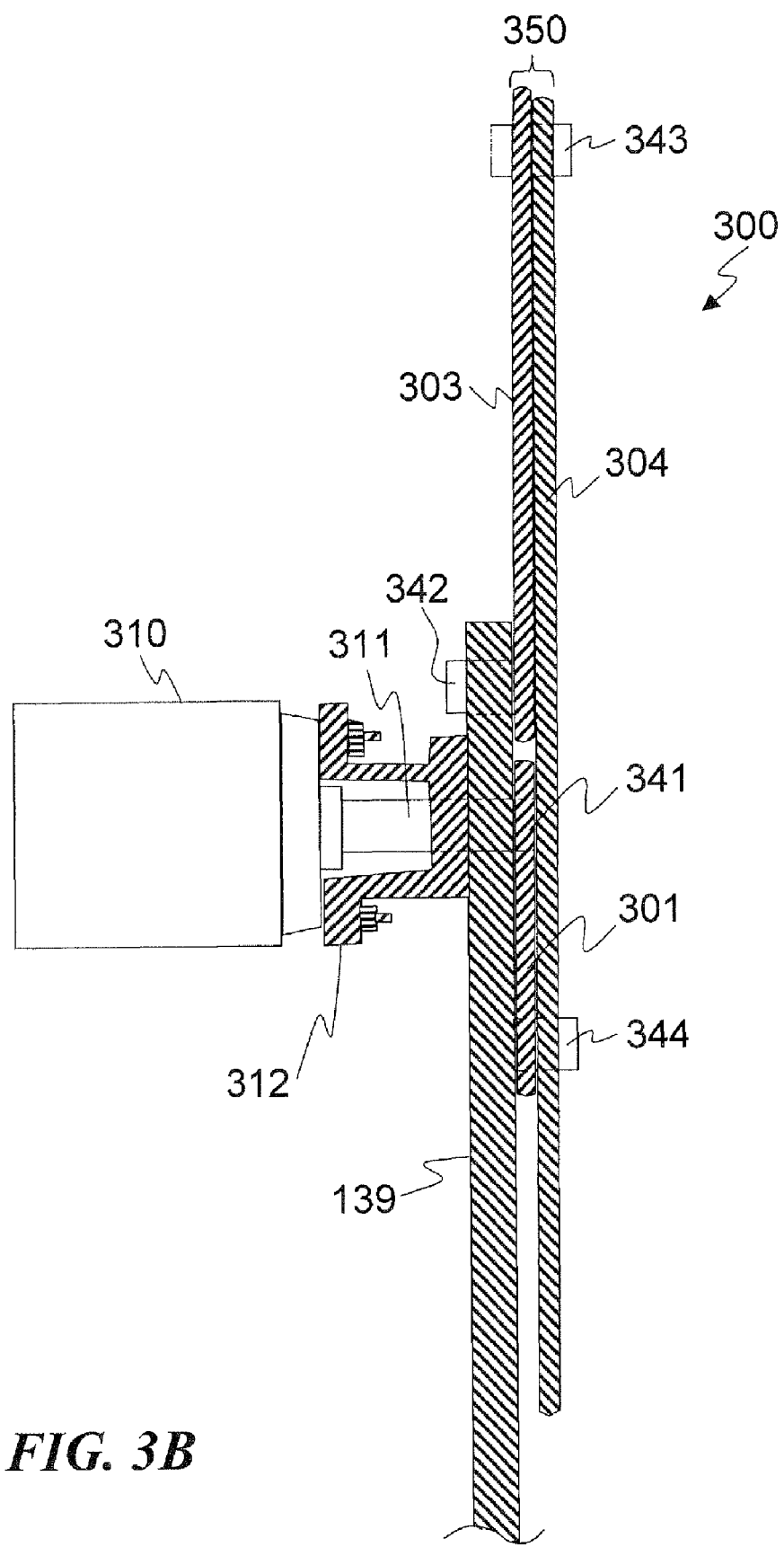
FIG. 3B is a cutaway side view of motor 310 that operates an elongated curvical distribution mechanism 350.

FIG. 3B is a cutaway side view of the embodiment of FIG. 3A, wherein motor 310 operates an elongated curvical distribution mechanism 350. Motor 310 is connected to bracket 312 that is attached to sloping wall 139. Motor 310 turns shaft 311 which is connected (e.g., by a pin or by welding to axle 341) to first bar 301, which rotates in a curvical motion along sloping wall 139. Third bar 303 is connected hingedly by pin 342 to sloping wall 139. Fourth bar 304 is connected hingedly by pin 343 to third bar 303 and connected hingedly by pin 344 to first bar 301 near an end distal to its connection to motor 310.

Motor 310 rotates first bar 301 in a curvical motion along sloping wall 139. The circular motion of first bar 301 drives fourth bar 304 connected hingedly by pin 344 to third bar 303 connected hingedly by pin 343 which is connected hingedly by pin 342 to sloping wall 139 in a curvical motion. The curvical motion of fourth bar 304 agitates and sweeps feed 98 along, and at a distance from, sloping wall 139 in curvical motions in order to prevent bridging 95 of feed 98 while displacing pressure along sloping wall 139 toward primary compression mechanism 130.

Figure 3C:
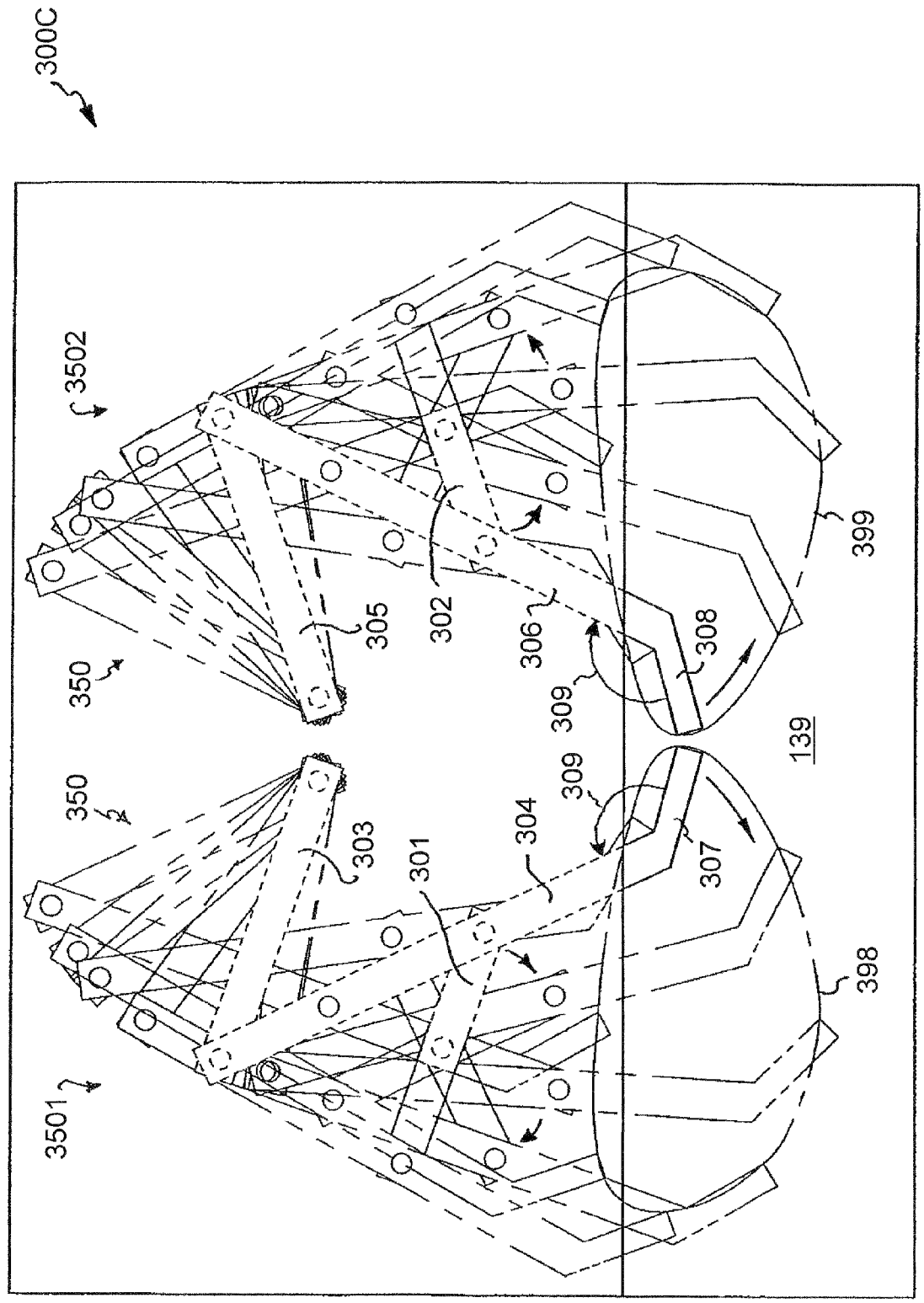
FIG. 3C is an angled top view of a dual distribution mechanism 300C.

FIG. 3C is an angled top view of a dual distribution mechanism 300C illustrating first bar 301 and second bar 302 along sloping wall 139. First bar 301 is connected hingedly to fourth bar 304, which in turn is connected hingedly to third bar 303, which is connected hingedly to sloping wall 139. Second bar 302 is connected hingedly to sixth bar 306, which in turn is connected hingedly to fifth bar 305, which is connected hingedly to sloping wall 139. In some embodiments such as shown in FIG. 3C, the end segment 307 of fourth bar 304 and the end segment 308 of sixth bar 306 are bent to an angle 309 (similar to the shape of a flat hockey stick) so that the respective ends 307 and 308 are flat and in the same plane as bars 304 and 306, respectively, and parallel to sloping wall 139.

As illustrated, the curvical motions of first bar 301 drives fourth bar 304 in a curvical motion and third bar 303 in a reciprocating motion along sloping wall 139. Second bar 302 drives sixth bar 306 in a curvical motion and fifth bar 305 in a reciprocating motion along sloping wall 139. Fourth bar 304 and sixth bar 306 oscillate their respective ends 307 and 308 in curvical motions along sloping wall 139, which agitates and sweeps feed 98 along sloping wall 139, preventing bridging of feed 98 in hopper 138 while displacing pressure along sloping wall 139 toward primary compression mechanism 130. Distribution mechanism 350 agitates and sweeps feed along sloping wall 139 to prevent compacting and bridging within hopper 138.

Figure 3D:
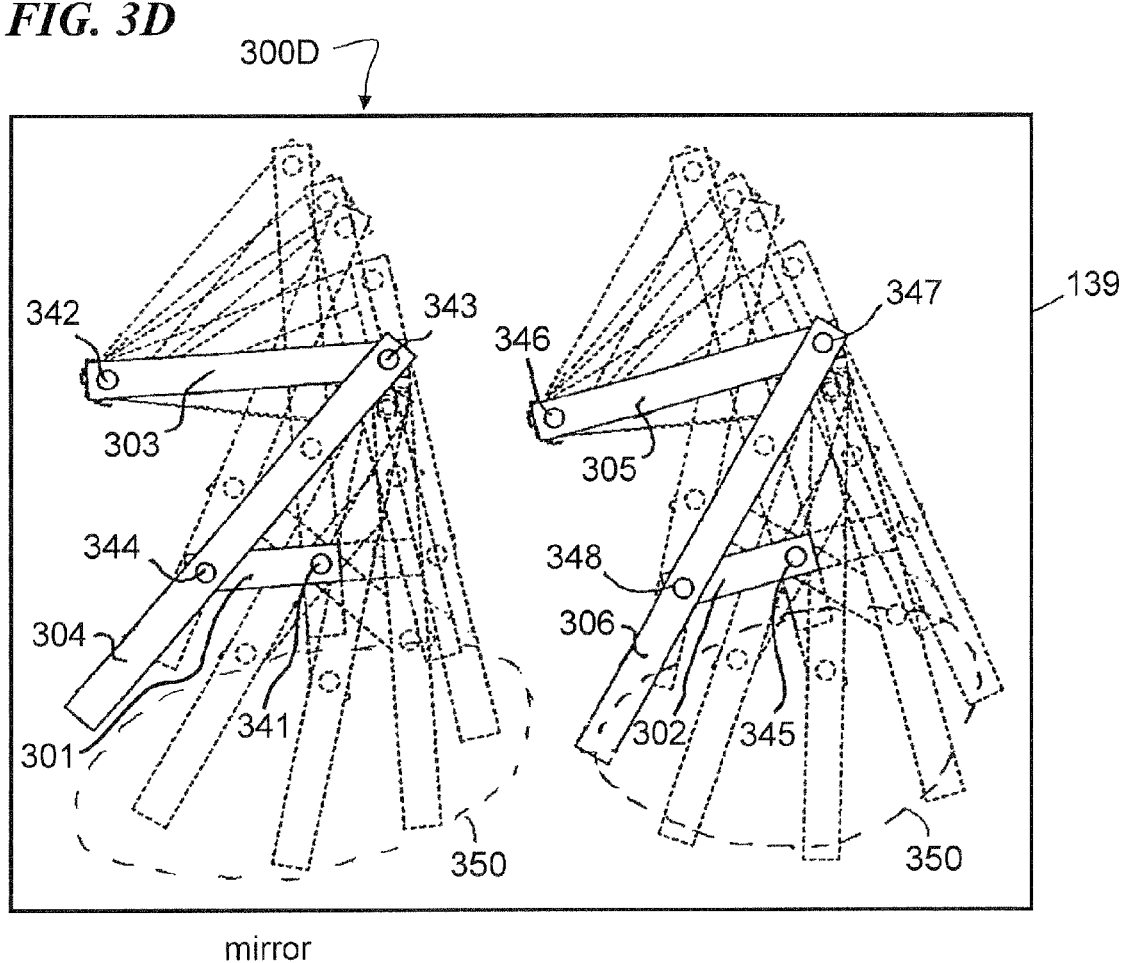
FIG. 3D is an angled top view of a dual distribution mechanism 300D.

FIG. 3D is an angled top view of dual distribution mechanism 300D. The apparatus 300D of FIG. 3D differs from apparatus 300C of FIG. 3C in that the curvical motions of the lower ends of bars 304 and 306 in apparatus 300D are positioned to more fully cover the lower portion of sloping wall 139. Note that sections 398 and 399 may not be adequately swept in the embodiment of FIG. 3C, but no such sections exist in FIG. 3D. First bar 301 is connected to axle 341 of first motor 310. First bar 301 is connected hingedly by pin 344 to fourth bar 304 connected hingedly by pin 343 to third bar 303 which is connected hingedly by pin 342 to sloping wall 139. Second bar 302 is connected to axle 345 of second motor 315. Second bar 302 is connected hingedly by pin 348 to sixth bar 306 connected hingedly by pin 347 to fifth bar 305 which is connected hingedly by pin 346 to sloping wall 139.

As illustrated, the curvical motions of first bar 301 drives fourth bar 304 in a curvical motion and third bar 303 in a reciprocating motion along sloping wall 139. Second bar 302 drives sixth bar 306 in a curvical motion and fifth bar 305 in a reciprocating motion along sloping wall 139.

Figure 3E:
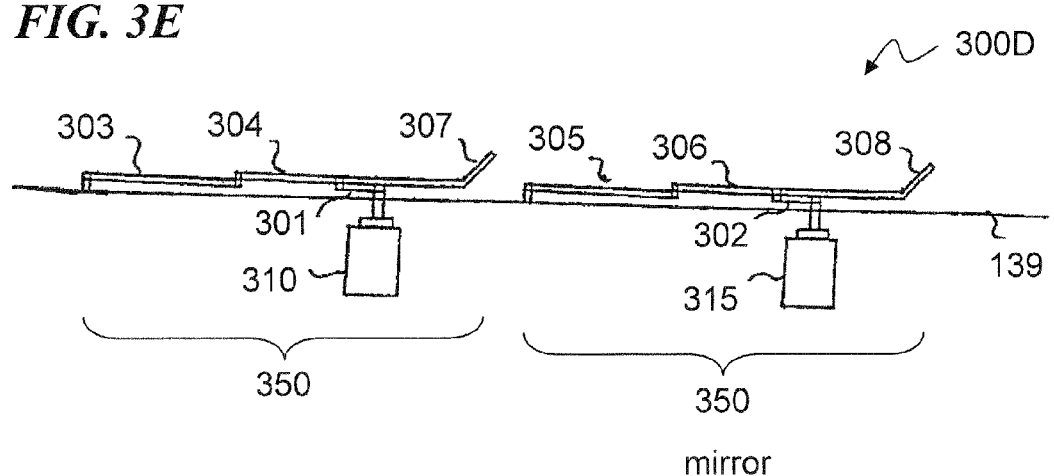
FIG. 3E is a schematic cross section of distribution system 300D having motors 310 and 315 mounted on sloping wall 139 and two distribution mechanisms 350.

FIG. 3E is a schematic cross section of distribution system 300D of FIG. 3D having motors 310 and 315 mounted on sloping wall 139 and two distribution mechanisms 350. Motor 310 is connected to first bar 301. First bar 301 is connected hingedly to fourth bar 304, which is connected hingedly to third bar 303 which is connected hingedly to sloping wall 139. Motor 315 is connected to second bar 302. Second bar 302 is connected hingedly to sixth bar 306, which is connected hingedly to fifth bar 305 which is connected hingedly to sloping wall 139. In some embodiments, fourth bar 304 and sixth bar 306 are bent to an angle 309 so that ends 307 and 308 are distal to sloping wall 139.

Figure 4:
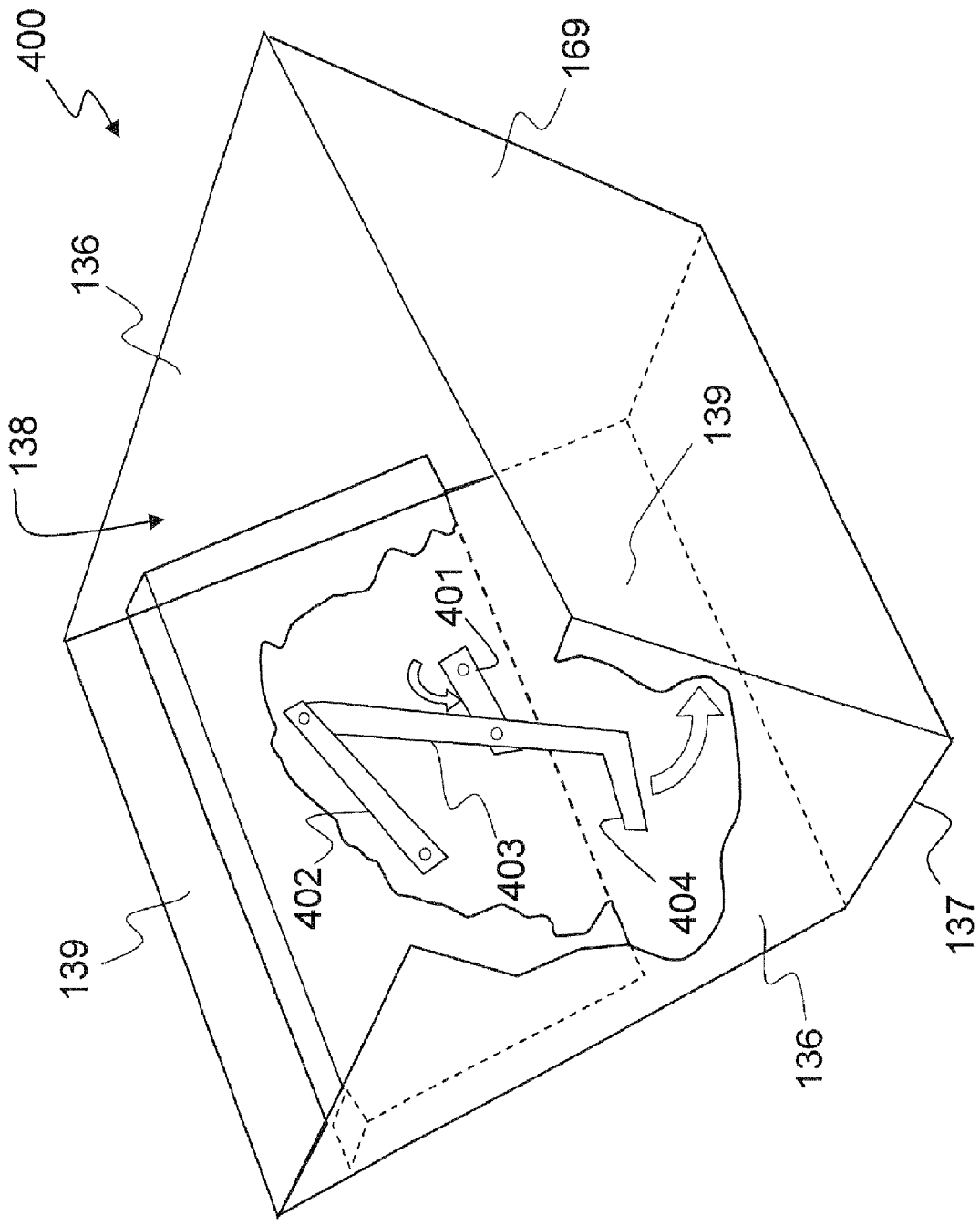
FIG. 4 is an isometric cutaway view showing hopper 400 and a single distribution mechanism 250 on sloping wall 139.

FIG. 4 is an isometric cutaway view of feed-input apparatus 400, having hopper 138 and a single distribution mechanism 350 on sloping wall 139. Bar 401 is connected hingedly to bar 403, which is hingedly connected to bar 402, which is hingedly connected to sloping wall 139. Bar 401 is bent at end segment 404 to a shape similar to a hockey stick, flat and in plane with from sloping wall 139. This provides a lower-edge surface that helps push the feed in the hopper in a direction that is more downward than the sideways direction that results if the bar is straight. Either configuration (straight or hockey-stick shaped bars) agitates the feed to prevent bridging.

Figure 5:
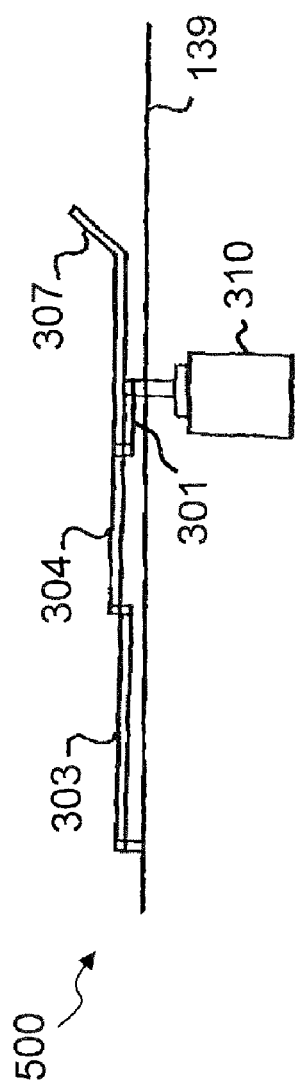
FIG. 5 is a schematic cross section of motor 310 showing sloping wall 139 and one distribution mechanism 350.

FIG. 5 is a schematic cross section of feed-input apparatus 400 of FIG. 4, having motor 310 showing sloping wall 139. Motor 310 is connected to first bar 301. First bar 301 is connected hingedly to fourth bar 304 connected hingedly to third bar 303 which is connected hingedly to sloping wall 139. In some embodiments, fourth bar 304 is bent to an angle at end 307 distal to sloping wall 139.

Figure 6:
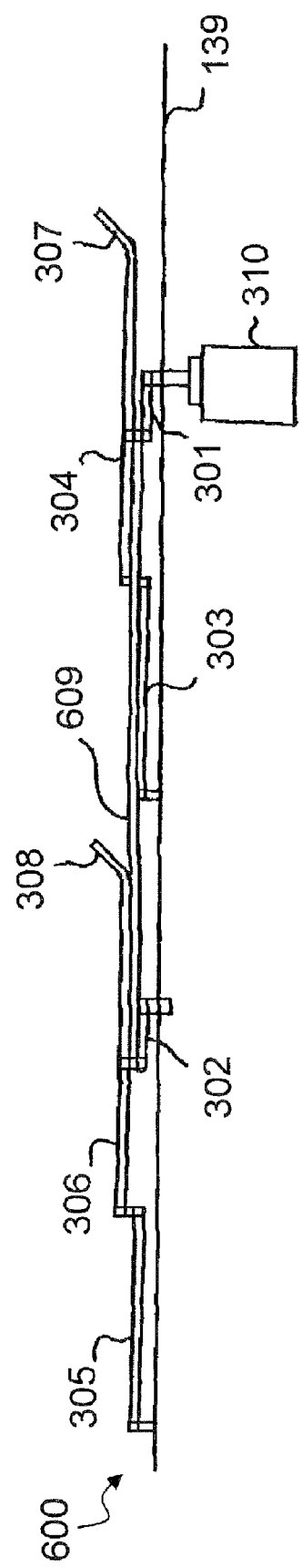
FIG. 6 is a schematic cross section of single motor 310 driving a dual-actuated distribution mechanism 600 on sloping wall 139.

FIG. 6 is a schematic cross section of single motor 310 driving a dual-actuated distribution mechanism 600 powered by single motor 310 on sloping wall 139. Motor 310 is connected to rotate first bar 301. First bar 301 is connected hingedly to fourth bar 304 having end 307 bent away from sloping wall 139 and connected hingedly to third bar 303 which is connected hingedly to sloping wall 139. Second bar 302 is without motor 315 and is connected hingedly to sloping wall 139. Second bar 302 is connected hingedly to sixth bar 306 having end 308 distal to sloping wall 139 connected hingedly to fifth bar 305 which is connected hingedly to sloping wall 139. Connecting bar 609 is connected hingedly and sandwiched between first bar 301 and fourth bar 304 and is connected hingedly and sandwiched between second bar 302 and sixth bar 306. Connecting bar 609 forces arm 302 to follow the curvical motion of arm 301.

The curvical motions of distribution mechanism 350 in FIG. 4 and in FIG. 5 and dual-actuated distribution mechanism 600 in FIG. 6 all agitate and sweep feed 98 along sloping wall 139 while displacing pressure along sloping wall 139 toward primary compression mechanism 130 and displaces pressure within hopper 138 from above primary compression mechanism 130 to a portion of the interior of hopper 138.

Figure 7:
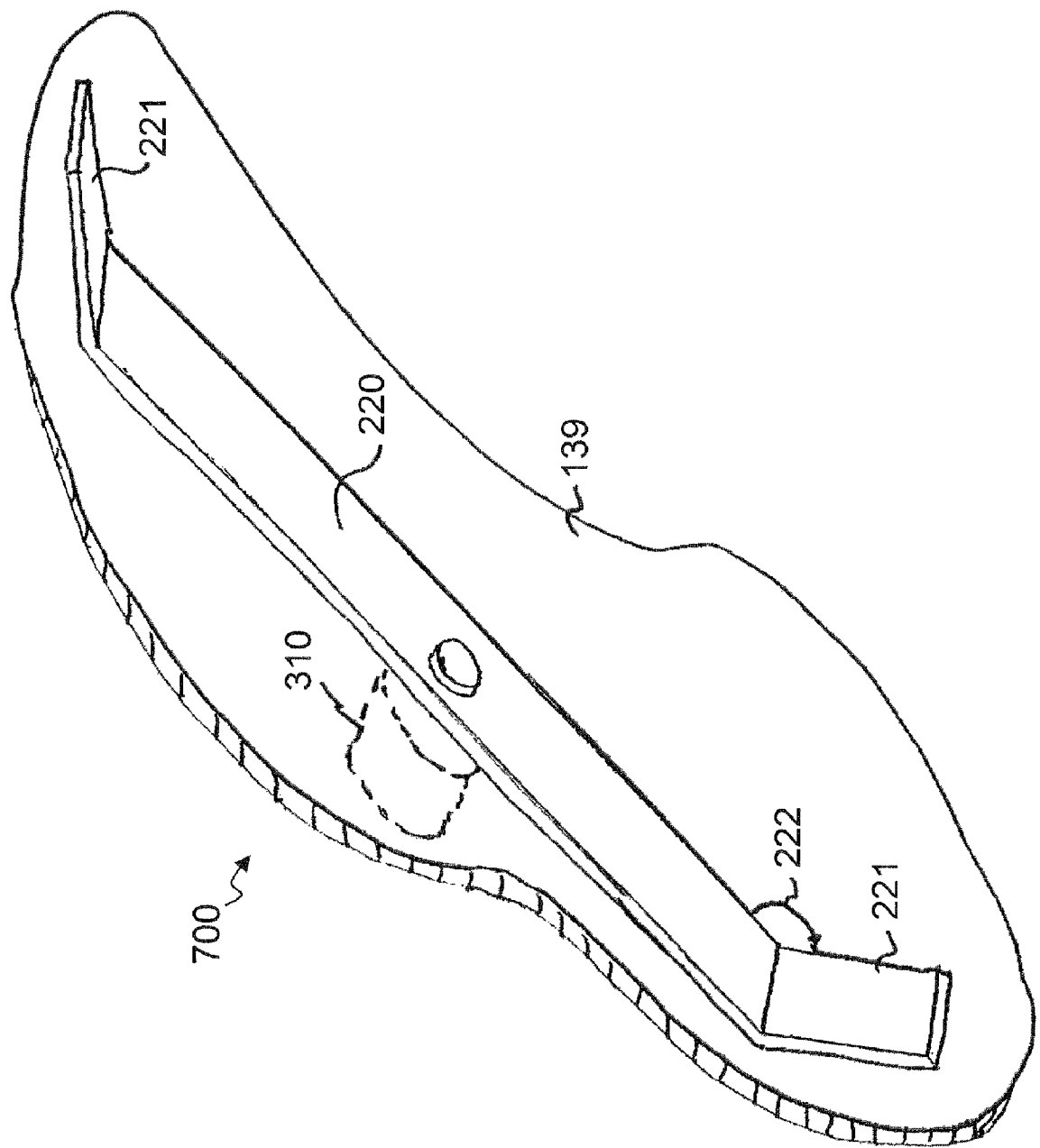
FIG. 7 is an isometric cutaway view of sloping wall 139 and motor 310 showing a single arm dual sweeper distribution mechanism 700.

FIG. 7 is an isometric cutaway view of sloping wall 139 and motor 310 showing a single-arm dual-sweeper distribution mechanism 700. Motor 310 is solidly connected to single sweeping bar 220 bent to angles 222 at both ends 221 distal to sloping wall 139.

Sweeping bar 220 spins in a curvical motion whereby both ends 221 curvically agitate and sweep feed 98 along sloping wall 139 while displacing pressure along sloping wall 139 toward primary compression mechanism 130.

Figure 8:
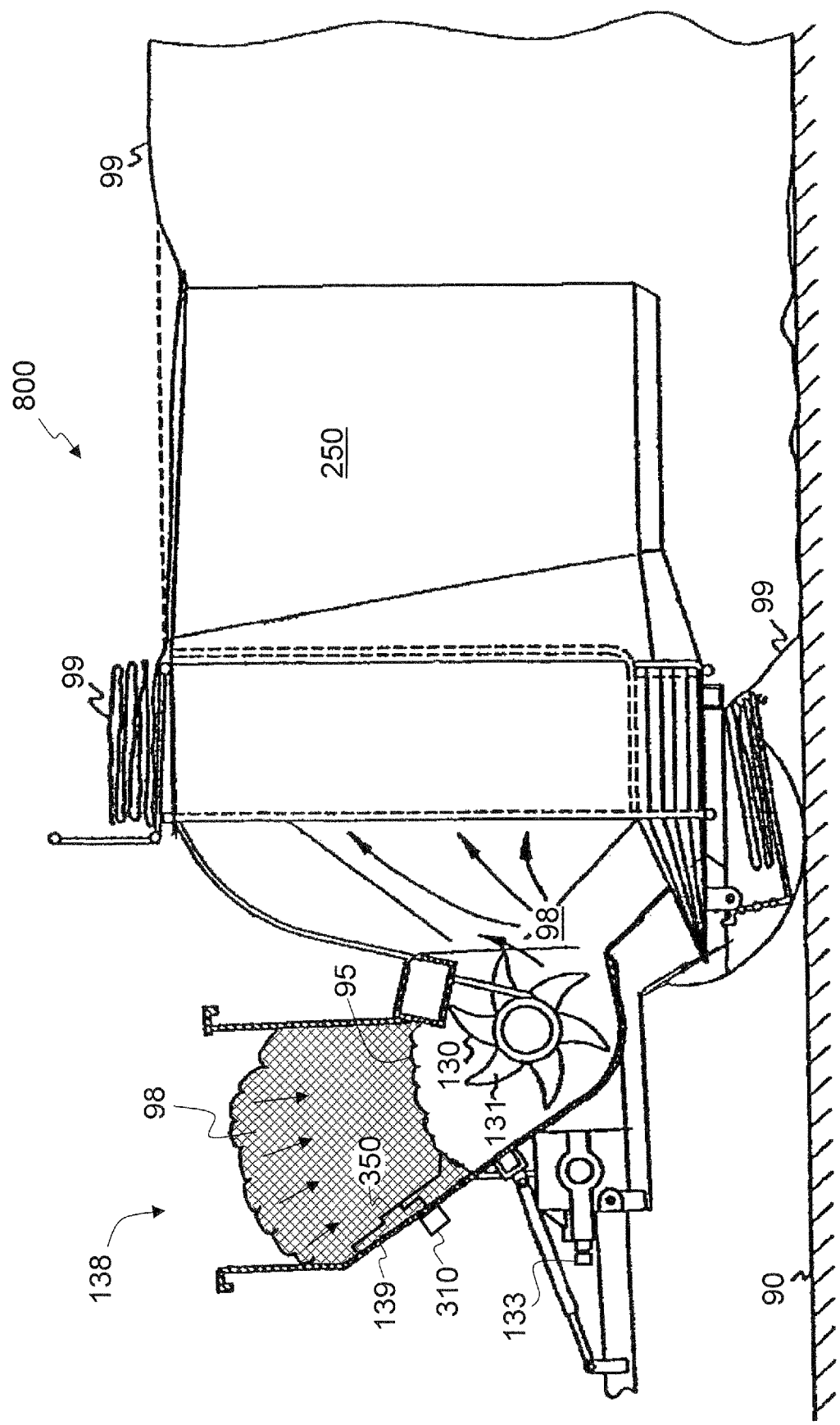
FIG. 8 is a cross-section side view of bagging machine 800 having motor 310 powering a curvical sweeper distribution mechanism 350 on sloping wall 139.

FIG. 8 is a cross-section side view of bagging machine 800 having motor 310 powering a single curvical sweeper distribution mechanism 350 on sloping wall 139. FIG. 8 depicts motor 310 attached to the exterior of sloping wall 139. Attached to motor 310 is a single distribution mechanism 350 on the interior of sloping wall 139. Under distribution mechanism 350 is primary compression mechanism 130 having a rotor with multiple teeth 131 and powered by power-take-off (PTO) shaft 133.

Agricultural feed 98 is deposited into hopper 138 and moves downward along sloping wall 139. In the absence of distribution mechanism 350, feed 98 (particularly if it is wet) compacts into the tapering hopper 138, thus forming bridge 95. Motor 310 powers distribution mechanism 350 which curvically agitates and sweeps feed 98 along sloping wall 139, displacing pressure along sloping wall 139 toward primary compression mechanism 130, preventing the bridging 95 of feed 98. Feed 98 is pushed and forced up and back by primary compression mechanism 130 into tunnel 250 where feed 98 is compacted and extruded into bag 99 which is stretched from the circumference of the back of tunnel 250 and deployed as agricultural bagger apparatus 800 moves forward along ground 90.

Figure 9A:
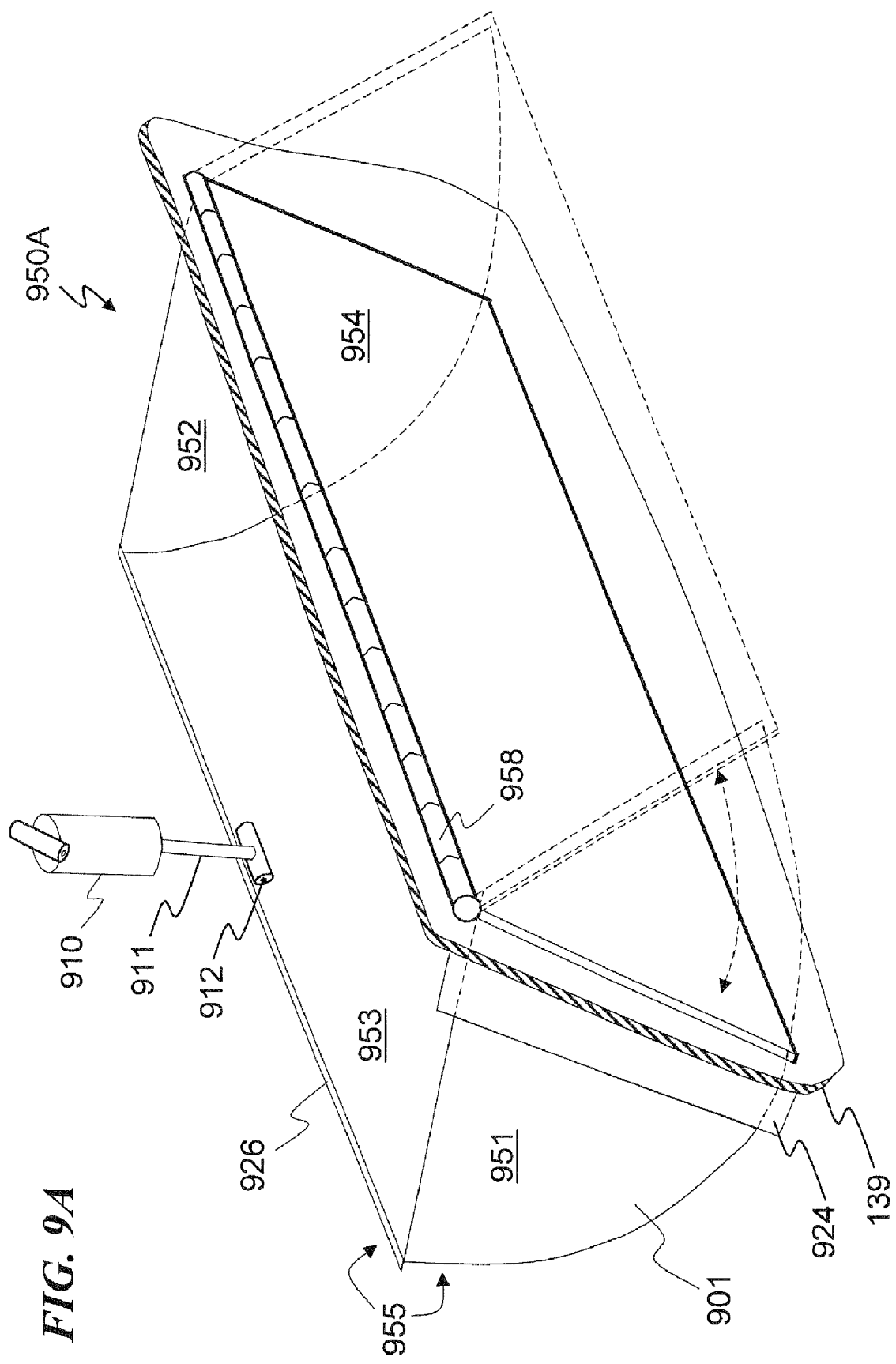
FIG. 9A is an isometric view of hydraulic cylinder 910 showing hinged movement of wedge-shaped secondary compression mechanism 901.

FIG. 9A is an isometric view of piston 901 showing hinged movement of wedge-shaped secondary compression mechanism 950A. Hydraulic cylinder 910 and connecting rod 911 are attached to hinge 912 on the top surface 953. In some embodiments, piston 901 includes side plates 951 and 952, and arched lower plate 953 and compacting surface 954 adjoined by hinge 958 to tunnel front wall 251 of tunnel 250 located above primary compression mechanism 130 and on the upper portion of the cavity of tunnel 250. A lip 926 on the trailing edge of plate 953 of the wedge-shaped piston is stopped by flange 924 and flush with the exterior of flange 924 at the compaction stage. Wedge-shaped piston 901 protrudes inward into tunnel 250 at the compacting stage and protrudes exterior to tunnel 250 at the non-compacting stage, creating a reciprocating motion as illustrated.

In some embodiments, piston 901 is activated for an approximately 1-second compression cycle that occurs once every 10 seconds. Thus, primary compression mechanism 130 is filling the volume in back of piston 901 for approximately 9 seconds, then piston 901 is extended into tunnel 250 for less than about one second and then withdrawn, leaving space for more feed to be deposited by primary compression mechanism 250.

Figure 9E:
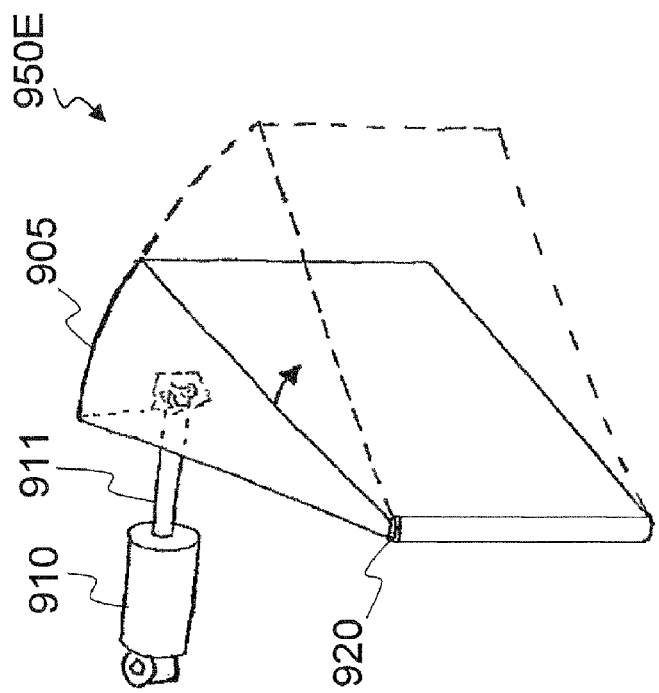
FIG. 9E is an isometric view of hydraulic cylinder 910 showing hinged movement of wedge-shaped secondary compression mechanism 905.
Figure 9B:
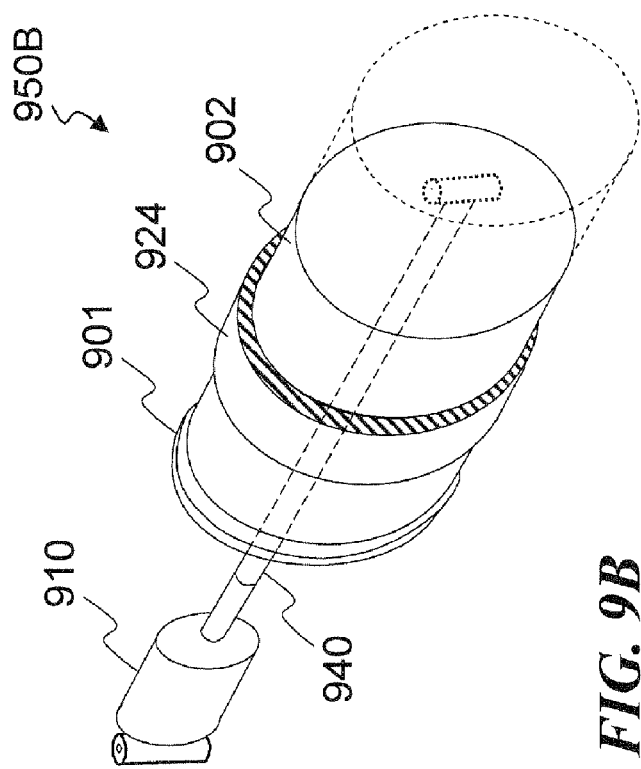
FIG. 9B is an isometric view of a hydraulic cylinder 910 connected to cylindrical piston 904.

FIG. 9B is an isometric view of another embodiment, having hydraulic cylinder 910 connected to cylindrical piston 902 which may be used as an alternative to the embodiment of FIG. 9A. Hydraulic cylinder 910 is connected to piston rod 940 which pushes piston 902 through sleeve 924, but not further than surrounding flange 901, in a reciprocating motion as illustrated.

Figure 9D:
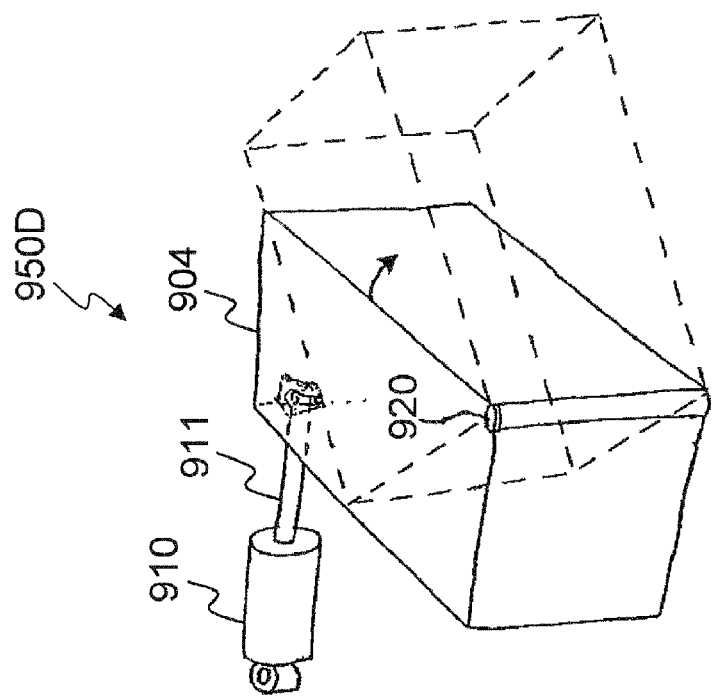
FIG. 9D is an isometric view of hydraulic cylinder 910 showing hinged movement of rectangular secondary compression mechanism 904.
Figure 9C:
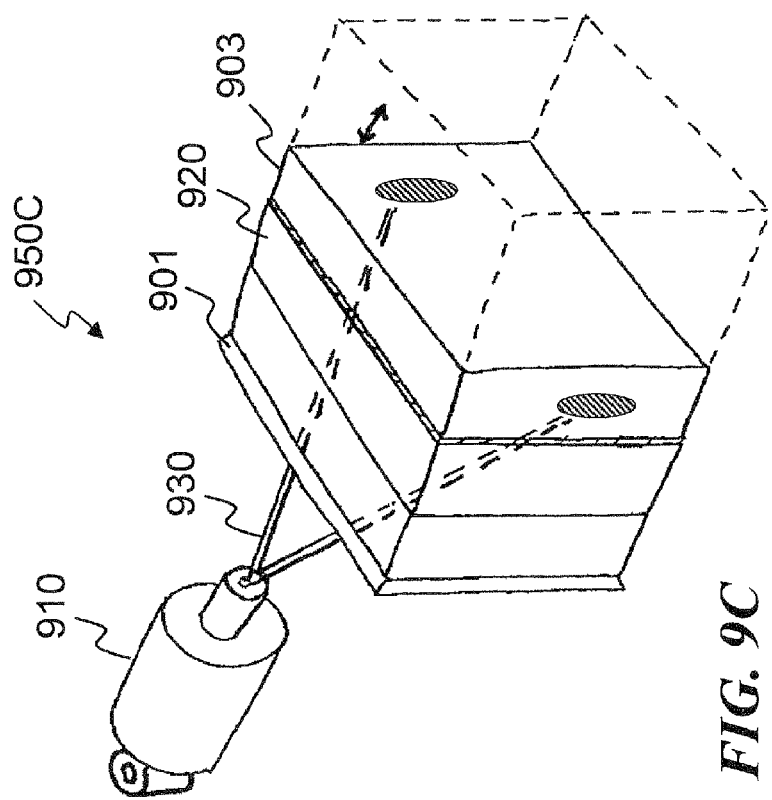
FIG. 9C is an isometric view of secondary compression mechanism 950 having cylinder 910 and rectangular piston 903 connected by a bifurcated connecting rod 930.

FIG. 9C is an isometric view of another embodiment, having secondary compression mechanism 950 having hydraulic cylinder 910 connected to piston rod 911 and connected to rectangular piston 903 by a bifurcated connecting rod 930 which may be an alternative to FIGS. 9A and 9B. Hydraulic cylinder 910 compresses piston rod 911 connected to bifurcated connecting rod 930 whereby rectangular piston 903 is pushed through sleeve 920 but not further than flange 901 in a reciprocating motion as illustrated.

FIG. 9D is an isometric view of hydraulic cylinder 910 showing hinged movement of rectangular secondary compression mechanism 950 which may be an alternative to FIGS. 9A, 9B and 9C. Hydraulic cylinder 910 is connected to piston rod 911 and reciprocates rectangular piston 90 on hinge 920 as illustrated.

FIG. 9E is an isometric view of hydraulic cylinder 910 attached to piston rod 911 showing hinged movement of wedge-shaped secondary compression mechanism 950 which may be an alternative to FIGS. 9A, 9B, 9C and 9D. Hydraulic cylinder 910 is connected to piston rod 911 and reciprocates wedge-shaped piston 905 on hinge 920 as illustrated.

FIG. 9F is an isometric view of hydraulic cylinder 950 showing hinged movement of a single plated secondary compression mechanism 950. Hydraulic cylinders 910 and piston arms 911 are located at opposite sides 136 of hopper chute 138. Piston arms 911 attach to hinges 912. Piston brackets consisting of top bars 956 and 957 and arched bars 953 which connect to hinges 912 are located at opposite ends on side walls 136 opposite sloping wall 139 of hopper 138. Top bars 956 and 957 and arched bars 953 fit into sleeves 970 attached to compacting plate 954 and located on either side of hopper 138. Compacting plate 954 stiffened and supported by bracket 968, which, in some embodiments, is a hollow pipe having a triangular cross section welded to the back of plate 954 on the non-compacting side of plate 954. Plate 954 reciprocates or swings on hinge 958. Secondary compression mechanism 950 is mounted exterior of tunnel 250 and compacting plate 954 is flush with interior tunnel wall 250 at the non-compacting stage and protrudes further inward into tunnel 250 at the compacting stage. Exterior protrusions 971 of the exterior tunnel wall 250 act as stops for the piston brackets.

Figure 9G:
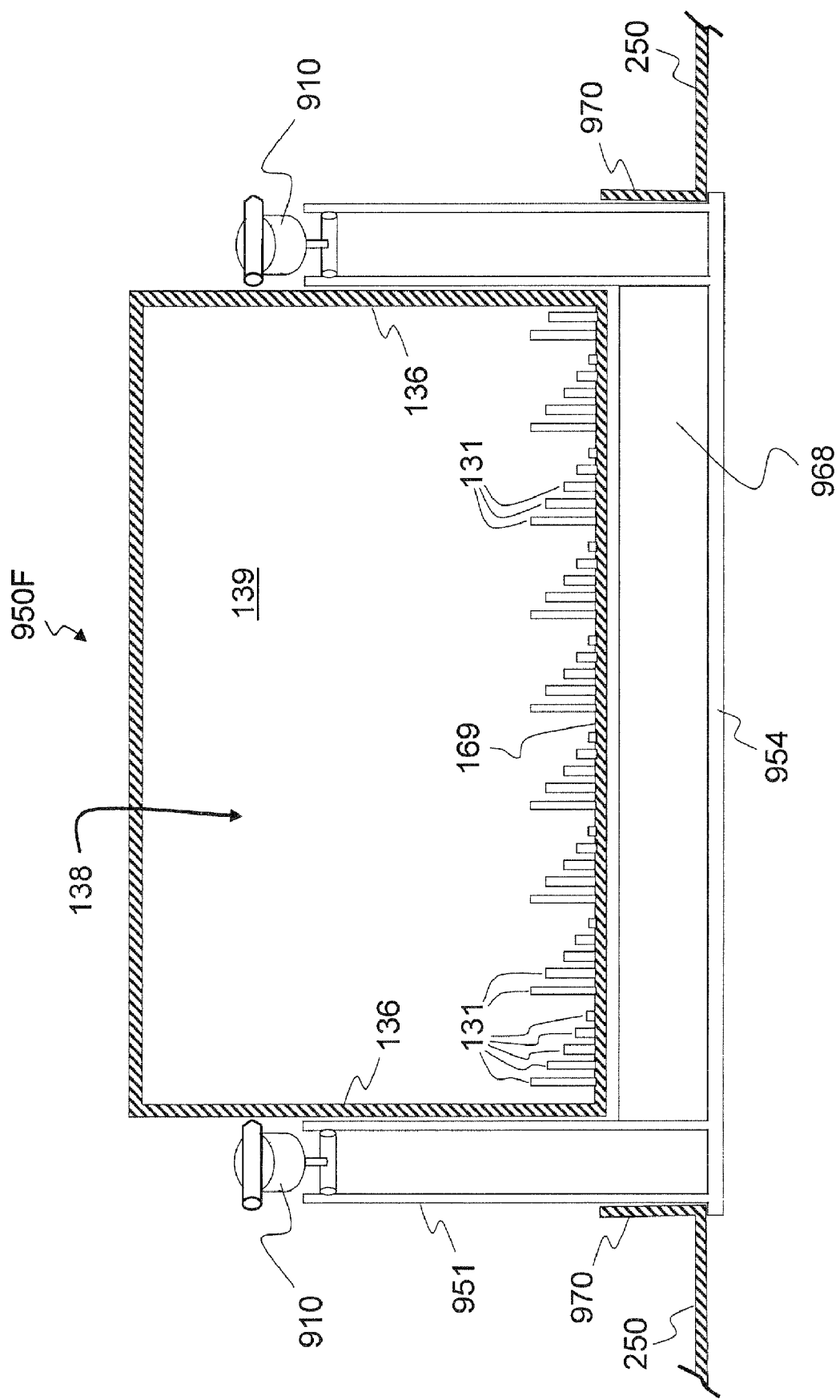
FIG. 9G is a top view of hydraulic cylinder 910 showing a single plated secondary compression mechanism 950.

FIG. 9G is a top view of hydraulic cylinder 950 showing a single plated secondary compression mechanism 950. Hydraulic cylinders 910 and piston arms 911 are located at opposite sides 136 of chute 138. Piston arms 911 attach to hinges 912. Piston brackets consisting of top bars 956 and 957 and arched bars 953 that connect to hinges 912 (not shown) and are located at opposite ends on side walls 136 opposite sloping wall 139 of hopper 138. Top bars 956 and 957 and arched bars 953 fit into sleeves 970 attached to compacting plate 954 and located on opposite sides of hopper 138. Compacting plate 954 supported by stiffening bracket 968, which, in some embodiments, is a hollow tube having a triangular cross section on its non-compacting (back) side. Plate 954 reciprocates (swings) on hinge 958. Secondary compression mechanism 950 is mounted exterior of tunnel 250 and compacting plate 954 is flush with interior tunnel wall 250 at the non-compacting stage and protrudes further inward into tunnel 250 at the compacting stage. Exterior protrusions 971 of the exterior tunnel wall 250 act as stops for the piston brackets.

Figure 9H:
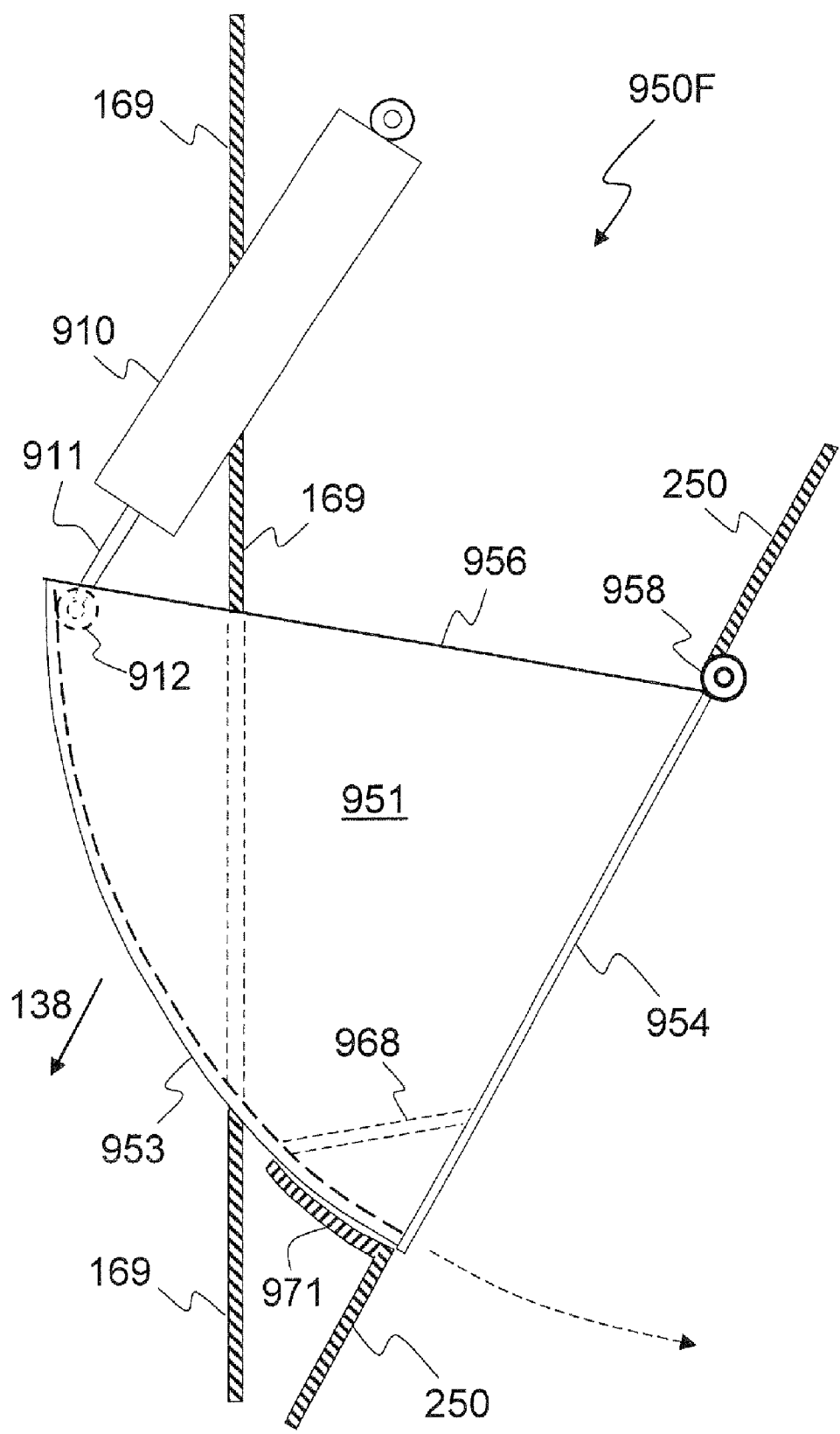
FIG. 9H is a side view of hydraulic cylinder 910 showing hinged movement of a single plated secondary compression mechanism 950.

FIG. 9H is a side view of hydraulic cylinder 910 showing hinged movement of a single plated secondary compression mechanism 950. Hydraulic cylinder 910 and piston arm 911 are attached to hinge 912. A piston bracket consisting of top bar 956 and arched bar 953 which connect to hinge 912 is located at wall 136 opposite sloping wall 139 of hopper 138. Top bars 956 and arched bar 953 fit into sleeve 970 (not shown) attached to compacting plate 954. At one point, tunnel 250 bends outward at 971 external to tunnel 250 toward hopper wall 169 which is opposite sloping wall 139. Compacting plate 954 is, in some embodiments, supported by an angled stiffening bracket or tube 968 on its lower back side (the back side is the face opposite the compacting face, wherein the lower edge is the edge opposite hinge 958). Secondary compression mechanism 950 is mounted exterior of tunnel 250 and compacting plate 954 is flush with interior tunnel wall 250 at the non-compacting stage and protrudes inward further into tunnel 250 at the compaction stage. Exterior protrusion 971 of the exterior tunnel wall 250 acts as a stop for the piston bracket.

By surrounding the input hopper 138 on the left and right sides with compression mechanism 950 but having compacting plate 954 extend across most of the width of the tunnel, thus providing a very large width of even compaction across the top of the tunnel, while leaving hopper 138 open to the maximum extent. Bracing 968 stiffens plate 954.

FIGS. 9A, 9B, 9C, 9D, 9E, 9F, 9G and 9H all illustrate the operation of various reciprocating secondary compression mechanism which compact feed 98 in tunnel 250 as feed 98 is pushed into bag 99. All of these pistons compact feed 98 from the upper portion of tunnel 250 toward the central portion of tunnel 250 and displaces pressure from the lower portion of tunnel 250 to the upper portion of tunnel 250. The result is a feed bag 98 that is more compacted with feed.

Figure 10:
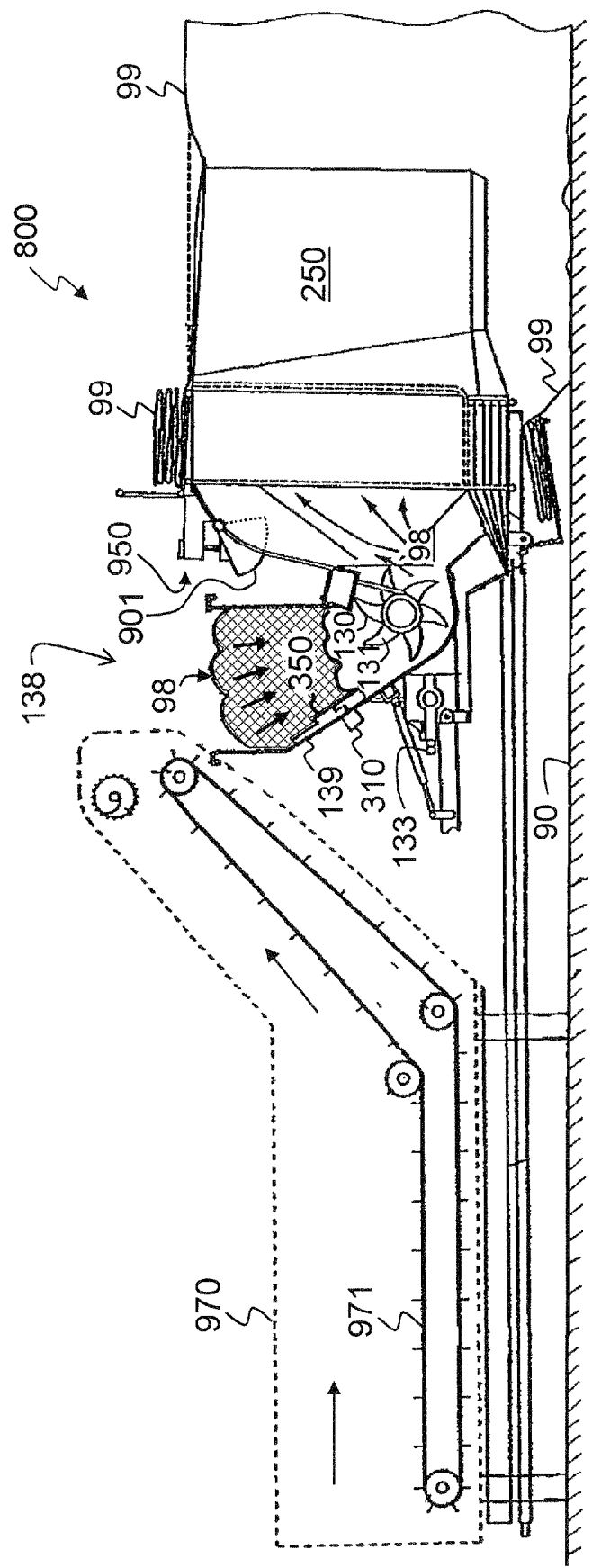
FIG. 10 is a side view of bagging machine 800 having secondary compression mechanism 950 including swinging piston 910 driven by hydraulic compacting mechanism 901.

FIG. 10 is a side view of bagging machine 800 consisting of hinged wedge-shaped secondary compression mechanism 950 driven by hydraulic cylinder 910. The secondary compression mechanism 950 is located above primary compression mechanism 130 and on the upper portion of tunnel cavity 250 whereby hydraulic cylinder 910 is located exterior of tunnel 250 and wedge-shaped piston 901 is also located outside of tunnel 250 at the non-compacting stage and inside of tunnel 250 at the compacting stage.

As feed 98 is deposited into hopper 138, it moves downward along sloping wall 139 where motor 310 powers secondary distribution mechanism 950 which curvically agitates and sweeps feed 98 along sloping wall 139 within tunnel 250 above primary compression mechanism 130. Feed 98 is pushed and forced up and back by primary compression mechanism 130 into tunnel 250 where secondary compression mechanism 950, powered by hydraulic cylinder 910, operates a hinged wedge-shaped piston 901 in a reciprocating motion to compact feed 98 in tunnel 250 which is compacted into bag 99. Wedge-shape piston 901 compacts feed 98 from the upper portion of tunnel 250 toward the central portion of tunnel 250 and displaces pressure from the lower portion of tunnel 250 to the upper portion of tunnel 250. The result is a feed bag 99 that is filled with more compacted feed 98.

Figure 11:
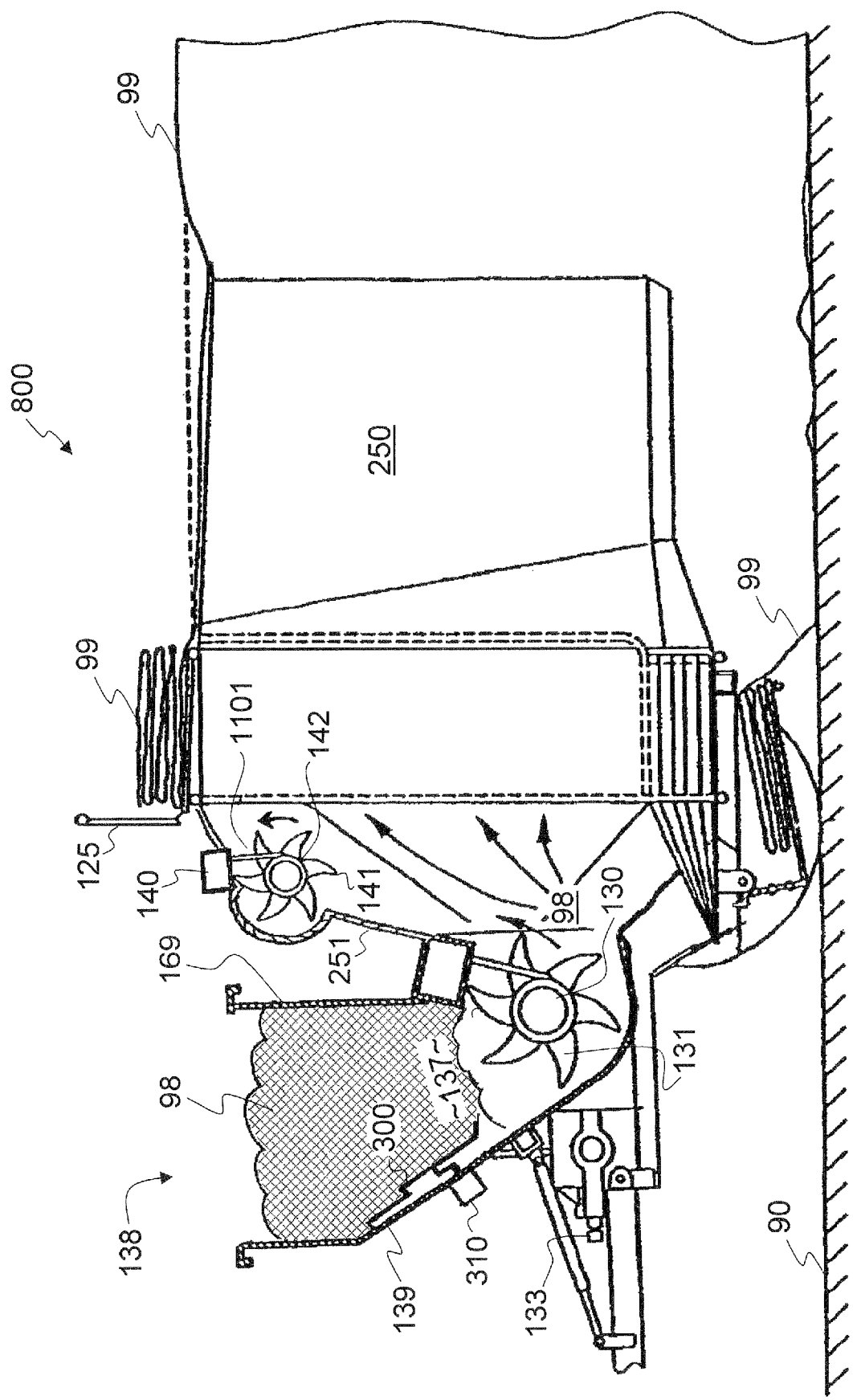
FIG. 11 is a cross section of bagging machine 100 showing a single distribution mechanism 250 on sloping wall 139 and a cross section view of secondary compression mechanism 1101.

FIG. 11 is a cross section of bagging machine 800 showing a single distribution mechanism 300 on sloping wall 139 and a cross section view of movement of an alternative rotary secondary compression mechanism 1101. FIG. 11 depicts motor 310 attached to the exterior of sloping wall 139. Connected to motor 310 on the interior of sloping wall 139 is single distribution mechanism 300. Beneath single distribution mechanism 300 and chute 137 is primary compression mechanism 130 consisting of a rotor having multiple teeth 131 and powered by power-take-off (PTO) shaft 133.

Agricultural feed 98 is deposited into hopper 138 whereby feed 98 moves downward along sloping wall 139. Motor 310 powers single distribution mechanism 300 which curvically agitates and sweeps feed 98 along sloping wall 139, displacing pressure along sloping wall 139 toward primary compression mechanism 130 and displaces pressure within hopper 198 from above primary compression mechanism 130 to a higher portion of the interior of hopper 138. Feed 98 is pushed and forced up and back by primary compression mechanism 130 into tunnel 250.

Above primary compression mechanism 130 is secondary compression mechanism 1101 attached to the upper portion of tunnel cavity 250. Secondary compression mechanism 1101 is located above primary compression mechanism 130 and on the upper portion of tunnel cavity 250 whereby motor 140 is exterior to tunnel wall 250 and rotating device 142. Rotating device 142 consists of multiple teeth 141 and is located interior to tunnel wall 250.

Secondary compression mechanism 1101 pushes and forces feed 98 received from primary compression mechanism 130 up and back toward the back of tunnel 250 by rotor 142. Rotor 142 rotates in a curvical motion displacing feed 98 from the upper portion of the tunnel toward the central portion of the tunnel displacing pressure from the lower portion of the tunnel to the upper portion of the tunnel having the effect of more efficiently dispersing feed 98 into bag 99 which is stretched from the circumference of the back of tunnel 250.

Secondary compression mechanism 1101 is particularly useful for dry feed 98 applications in view of the fact that non-dry feed 98 that is processed through rotating device 142 having multiple teeth 142 tends to mulch non-dry feed 98 to a puree-like consistency which is undesirable for use in the industry.

One aspect of the present invention provides an agricultural bagger apparatus 200 or 300 for compacting feed 98 into a horizontally deployed bag 99. Apparatus 200 or 300 includes a primary compression mechanism 130, an input hopper 138 that receives agricultural feed 98, hopper 138 having sloping wall 139 and a lower end exit chute 137 located to transfer agricultural feed 98 into primary compression mechanism 130. Apparatus 200 or 300 also includes first motor 310 coupled to sloping wall 139 of input hopper 138, and first distribution mechanism 250 or 350 inside hopper 138 to move agricultural feed 98 adjacent to sloping wall 139 in order to prevent feed 98 bridging 95 before primary compression mechanism 130, the distribution mechanism 250 or 350 being powered by first motor 310.

In some embodiments, first motor 310 is a rotary motor, and distribution mechanism 250 or 350 further comprises an elongated first bar 201 or 301 attached along its length to first motor 310 such that first motor 310 sweeps first bar 201 or 301 in a curvical motion along sloping wall 139.

In some embodiments, first bar 201 is bent to an angle 222 at an end distal to connection 211 to first motor 310. In other embodiments, a leading edge of the first bar forms a non-parallel angle relative to a radius of rotation of the first bar.

Some embodiments further include second motor 315 coupled to sloping wall 139 of input hopper 138, and elongated second bar 306 attached along its length to second motor 315 such that second motor 315 sweeps second bar 306 in a curvical motion along sloping wall 139.

In some embodiments, the apparatus further includes third bar 303 hingedly connected (for example, using pin 342) to a wall of hopper 138, fourth bar 304 hingedly connected (for example, using pin 343) to third bar 303 and hingedly connected (for example, using pin 344) to first bar 301 near an end distal to its connection (for example, using axle 341) to first motor 310. The apparatus also includes fifth bar 305 hingedly connected to sloping wall 139 of hopper 138, and sixth bar 306 hingedly connected to fifth bar 305 and hingedly connected to second bar 302 near an end distal to its connection to second motor 315.

In some embodiments, the apparatus includes fourth bar 304 having an end segment that is angled to a shape similar to a hockey stick, and sixth bar 306 having an end segment 388 that is also angled to a shape similar to a hockey stick, wherein bars 304 and 306 as well as end segments 387 and 388 are substantially parallel to sloping wall 139. In other words, the fourth bar 304 rotates substantially in a plane, is substantially flat in the plane of its rotation, and has an end segment 307 having a leading edge that is angled relative to a radius of rotation. The sixth bar 306 also rotates substantially in a plane, is substantially flat in the plane of its rotation, and has an end segment 308 having a leading edge that is angled relative to a radius of rotation.

In some embodiments, the apparatus further includes cover 330 attached to hopper 138 that covers an upper portion of distribution mechanism 300 to prevent feed 98 from binding 95 from one or more of the connections.

In a further embodiment, the apparatus includes tunnel 250 having an internal cavity, and connected to primary compression mechanism 130 to receive feed 98 output from primary compression mechanism 130 and operable to extrude feed 98 into bag 99 deployed from around tunnel 250. Secondary compression mechanism 950 is located above primary compression mechanism 130 and connected to tunnel 98 to displace pressure from above primary compression mechanism 130 and toward an upper portion of tunnel 250 cavity.

In another embodiment, the apparatus further includes tunnel 98 having an internal cavity, and connected to primary compression mechanism 130 to receive feed 98 output from primary compression mechanism 130 and operable to extrude feed 98 into bag 99 deployed from around tunnel 250. A secondary compression mechanism 950 located above primary compression mechanism 130 and connected to tunnel 250 to displace pressure from above primary compression mechanism 130 and toward an upper portion of tunnel 250 cavity.

FIG. 10 and FIG. 11 illustrate an apparatus and an associated method for improving the flow of agricultural feed 98 in agricultural feed stock bagging machine 800 having tunnel 250 and primary compression mechanism 130 fed by hopper 138 with sloping wall 139, the method includes depositing feed 98 into hopper 138 and displacing pressure along sloping wall 139 toward primary compression mechanism 130, in order for feed 98 to easily fall through hopper 138 to primary compression mechanism 130. Displacing pressure includes sweeping feed 98 along sloping wall 139 in a curvical motion.

Some embodiments also include displacing pressure within tunnel 250 from above the primary compression mechanism 130 to a higher portion of tunnel 250 interior, in order to provide a higher compaction in the upper portion of the tunnel 250. Thus, FIG. 10 and FIG. 11 further illustrates pushing feed 98 into tunnel 98 using primary compression mechanism 130, displacing pressure within tunnel 98 from above primary compression mechanism 130 to a higher portion of tunnel 250 interior.

Some embodiments of the method include agitating feed 98 within a circumference of the curvical motion along sloping wall 139 in order for feed 98 to easily fall through hopper 138 to primary compression mechanism 130. In some embodiments, the method displaces pressure by sweeping feed 98 along sloping wall 139 in a first curvical motion and in a second separated curvical motion, both along sloping wall 139.

Some embodiments of the method include agitating feed 98 at a circumference of the two curvical motions and at a distance from sloping wall 139 in order for feed 98 to easily fall through hopper 138 to primary compression mechanism 130.

Some embodiments of the method further include directing feed 98 beyond an upper portion of the curvical motion in order that feed 98 is primarily swept at a lower portion of the curvical motions.

Some embodiments of the method further include displacing pressure and sweeping feed 98 along sloping wall 139 in a curvical motion along sloping wall 139.

Some embodiments of the method further include agitating feed 98 at a circumference of the curvical motion and at a distance from sloping wall 139 in order for feed 98 to easily fall through hopper 138 to primary compression mechanism 130.

Some embodiments of the method further include displacing pressure along sloping wall 139 toward primary compression mechanism 130 in order for feed 98 to easily fall through hopper 138 to primary compression mechanism 130.

FIG. 10 also shows a table 970 having a conveyor mechanism 971, as further described in patent application Ser. No. 09/721,268, referenced above. This input table allows a large quantity of feed to be deposited or dumped, for example, by a dump truck or front-end loader, which is then free to do other work while the feed is conveyed from table 970 into hopper 138.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An agricultural bagger apparatus for compacting feed into a horizontally deployed bag, the apparatus comprising:
    a first feed-compaction rotor having a plurality of teeth located and configured to revolve completely around a circumference surrounding an axis of rotation of the first feed-compaction rotor;
    an input hopper configured to receive agricultural feed above the first feed-compaction rotor, the hopper having a lower-end exit located to transfer the agricultural feed traveling downward through the hopper into the first feed-compaction rotor;
    a tunnel having an internal cavity, and connected to the first feed-compaction rotor to receive feed output from the first feed-compaction rotor and operable to extrude the feed into the bag deployed from around the tunnel, the tunnel having a top wall extending between top edges of two opposing side walls, wherein the first feed-compaction rotor is configured to compact feed from the hopper into the tunnel; and
    a second feed-compaction rotor having a plurality of teeth revolving around a circumference surrounding an axis of rotation of the second feed-compaction rotor, wherein the axis of rotation of the second feed-compaction rotor is, during normal operation of the apparatus, always fixedly located relative to the tunnel above a midpoint of the tunnel's height and wherein the plurality of teeth are configured to extend into feed in the tunnel above the first feed-compaction rotor and are configured to force and compact feed from above the first feed-compaction rotor toward the top wall of the tunnel cavity simultaneously with the feed being forced into the tunnel by the first rotor.

2. The apparatus of claim 1, wherein the apparatus has no other compression mechanisms that compact feed in the tunnel other than the first and second compaction rotors.

3. The apparatus of claim 1, wherein an outermost diameter of the plurality of teeth of the first feed-compaction rotor is larger than an outermost diameter of the plurality of teeth of the second feed-compaction rotor.

4. The apparatus of claim 1, wherein the tunnel has a tunnel front wall that forms an end of the tunnel in a direction of travel of the apparatus as it operates, wherein the direction of travel is away from the horizontally deployed bag once the bag is loaded with feed, and wherein the second feed-compaction rotor is recessed in the tunnel front wall.

5. The apparatus of claim 1, wherein the tunnel has a tunnel front wall that forms an end of the tunnel in a direction of travel of the apparatus as it operates, wherein the direction of travel is away from the horizontally deployed bag once the bag is loaded with feed, the apparatus further comprising a motor located on the tunnel front wall adjacent to the second feed-compaction rotor.

6. The apparatus of claim 1, wherein not all the feed moved into the tunnel by the first feed-compaction rotor is moved by the second feed-compaction rotor.

7. The apparatus of claim 1, wherein the tunnel has a tunnel front wall that forms an end of the tunnel in a direction of travel of the apparatus as it operates, wherein the direction of travel is away from the horizontally deployed bag once the bag is loaded with feed, wherein a tunnel side of the tunnel front wall faces away from the direction of travel toward the horizontally deployed bag once the bag is loaded with feed and a hopper side of the tunnel front wall faces toward the direction of travel and the hopper, wherein the axis of rotation of the second feed-compaction rotor is located further towards the direction of the horizontally deployed bag relative to the tunnel side of the front wall, and wherein the axis of rotation of the first feed-compaction rotor is located further towards the direction of travel than the hopper side of the front wall.

8. A method comprising:
    providing:
        an agricultural bagger having a first feed-compaction rotor having a plurality of teeth located and revolving completely around a circumference surrounding an axis of rotation of the first feed-compaction rotor,
        a gravity-fed input hopper that receives agricultural feed,
        a tunnel having an internal cavity, and connected to the first feed-compaction rotor to receive the feed output from the first feed-compaction rotor and operable to extrude the feed into a bag deployed from around the tunnel, the tunnel having a top wall extending between top edges of two opposing side walls, and
        a second feed-compaction rotor having a plurality of teeth revolving completely around a circumference surrounding an axis of rotation of the second feed-compaction rotor, wherein the axis of rotation of the second feed-compaction rotor is, during normal operation of the method, always fixedly located relative to the tunnel above a midpoint of the tunnel's height and wherein the plurality of teeth extend into the feed in the tunnel above the first feed-compaction rotor; and
    transferring the agricultural feed downward through the hopper into the first feed-compaction rotor;
    forcing and compacting feed into the tunnel using the first feed-compaction rotor;
    forcing and compacting feed from above the first feed-compaction rotor toward the top wall of the tunnel cavity using the second feed-compaction rotor simultaneously with the forcing and compacting of the feed into the tunnel by the first rotor;
    deploying the bag from around the tunnel such that a top portion of the bag deploys across the top wall of the tunnel; and
    extruding feed from the tunnel into the bag.

9. The method of claim 8, wherein the method provides no other compression mechanisms that compact feed in the tunnel other than the first and second compaction rotors.

10. The method of claim 8, wherein an outermost diameter of the plurality of teeth of the first feed-compaction rotor is larger than an outermost diameter of the plurality of teeth of the second feed-compaction rotor.

11. The method of claim 8, wherein the first and second compaction mechanisms provide most of the forcing and compacting function.

12. The method of claim 8, wherein not all the feed moved into the tunnel by the forcing and compacting feed by the first feed-compaction rotor toward the top wall of the tunnel cavity is moved by the forcing and compacting feed by the second feed-compaction rotor.

13. The method of claim 8, wherein the tunnel has a tunnel front wall that forms an end of the tunnel in a direction of travel of the apparatus as it operates, wherein the direction of travel is away from the horizontally deployed bag once the bag is loaded with feed, wherein a tunnel side of the tunnel front wall faces away from the direction of travel toward the horizontally deployed bag once the bag is loaded with feed and a hopper side of the tunnel front wall faces toward the direction of travel and the hopper, wherein the rotor is has an axis of rotation of the second feed-compaction rotor is located further towards the direction of the horizontally deployed bag relative to the tunnel side of the front wall, and wherein the axis of rotation of the first feed-compaction rotor is located further towards the direction of travel than the hopper side of the front wall.

14. The method of claim 8, wherein the providing of the tunnel includes providing a tunnel front wall that forms an end of the tunnel in a direction of travel of the apparatus as it operates, wherein the direction of travel is away from the horizontally deployed bag once the bag is loaded with feed, wherein a tunnel side of the tunnel front wall faces away from the direction of travel toward the horizontally deployed bag once the bag is loaded with feed and a hopper side of the tunnel front wall faces toward the direction of travel and the hopper, wherein the axis of rotation of the second feed-compaction rotor is located further towards the direction of the horizontally deployed bag relative to the tunnel side of the front wall, and wherein the axis of rotation of the first feed-compaction rotor is located further towards the direction of travel than the hopper side of the front wall.

15. An agricultural bagger apparatus for compacting feed into a horizontally deployed bag, the apparatus comprising:
an agricultural bagger having a first feed-compaction rotor having a plurality of teeth located and revolving completely around a circumference surrounding an axis of rotation of the first feed-compaction rotor,
an input hopper that receives agricultural feed,
a tunnel having an internal cavity, and connected to the first feed-compaction rotor to receive the feed output from the first feed-compaction rotor and operable to extrude the feed into a bag deployed from around the tunnel, the tunnel having a top wall extending between top edges of two opposing side walls, and
a second feed-compaction rotor having a plurality of teeth configured to revolve completely around a circumference surrounding an axis of rotation of the second feed-compaction rotor, wherein the axis of rotation of the second feed-compaction rotor is, during normal operation of the apparatus, always fixedly located relative to the tunnel above a midpoint of the tunnel's height and wherein the plurality of teeth extend into the feed in the tunnel above the first feed-compaction rotor; and
means for transferring the agricultural feed downward through the hopper into the first feed-compaction rotor;
means for forcing and compacting feed into the tunnel using the first feed-compaction rotor;
means for forcing and compacting feed from above the first feed-compaction rotor toward the top wall of the tunnel cavity using the second feed-compaction rotor simultaneously with the forcing and compacting of the feed into the tunnel by the first rotor;
means for deploying the bag from around the tunnel such that a top portion of the bag deploys across the top wall of the tunnel; and
means for extruding feed from the tunnel into the bag.

16. The apparatus of claim 15, the apparatus includes no other compaction mechanisms that compact feed in the tunnel other than the first and second compaction rotors.

17. The apparatus of claim 15, wherein an outermost diameter of the plurality of teeth of the first feed-compaction rotor is larger than an outermost diameter of the plurality of teeth of the second feed-compaction rotor.

18. The apparatus of claim 15, wherein the first and second compaction mechanisms provide most of the compaction function.

19. The apparatus of claim 15, wherein not all the feed moved into the tunnel by the means for forcing and compacting feed by the first feed-compaction rotor toward the top wall of the tunnel cavity is moved by the means for forcing and compacting feed by the second feed-compaction rotor.

20. The apparatus of claim 15, wherein the tunnel has a tunnel front wall that forms an end of the tunnel in a direction of travel of the apparatus as it operates, wherein the direction of travel is away from the horizontally deployed bag once the bag is loaded with feed, wherein a tunnel side of the tunnel front wall faces away from the direction of travel toward the horizontally deployed bag once the bag is loaded with feed and a hopper side of the tunnel front wall faces toward the direction of travel and the hopper, wherein the axis of rotation of the second feed-compaction rotor is located further towards the direction of the horizontally deployed bag relative to the tunnel side of the front wall, and wherein the axis of rotation of the first feed-compaction rotor is located further towards the direction of travel than the hopper side of the front wall.

* * * * *